United States Patent
Tam

(10) Patent No.: US 6,622,172 B1
(45) Date of Patent: Sep. 16, 2003

(54) DYNAMICALLY DELAYED ACKNOWLEDGEMENT TRANSMISSION SYSTEM

(75) Inventor: Ming-Chit Tam, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 0 days.

(21) Appl. No.: 09/489,154

(22) Filed: Jan. 21, 2000

(30) Foreign Application Priority Data

May 8, 1999 (SG) ............................................. 9902088

(51) Int. Cl.[7] ............................................. G06F 15/16
(52) U.S. Cl. ...................... 709/232; 709/237; 709/233; 709/235
(58) Field of Search ................................ 709/235, 238, 709/237, 234, 233, 232, 231; 370/230, 232, 229

(56) References Cited

U.S. PATENT DOCUMENTS

| | | | | |
|---|---|---|---|---|
| 5,627,970 A | * | 5/1997 | Keshav | 709/233 |
| 5,793,768 A | * | 8/1998 | Keshav | 370/400 |
| 5,822,532 A | * | 10/1998 | Ikeda | 709/224 |
| 6,038,606 A | * | 3/2000 | Brooks et al. | 709/235 |
| 6,041,039 A | * | 3/2000 | Kilkki et al. | 370/230 |
| 6,091,710 A | * | 7/2000 | Mawhinney | 370/236 |
| 6,105,064 A | * | 8/2000 | Davis et al. | 709/224 |
| 6,201,791 B1 | * | 3/2001 | Bournas | 370/234 |
| 6,219,713 B1 | * | 4/2001 | Ruutu et al. | 709/235 |
| 6,249,530 B1 | * | 6/2001 | Blanco et al. | 370/468 |
| 6,438,101 B1 | * | 8/2002 | Kalampoukas et al. | 370/229 |

FOREIGN PATENT DOCUMENTS

| | | |
|---|---|---|
| EP | 0651554 A1 | 5/1995 |
| EP | 0766468 A2 | 4/1997 |
| EP | 0 836 300 A2 | 4/1998 |

OTHER PUBLICATIONS

Anna Calveras Auge, et al., "Window Prediction Mechanism For Improving TCP in Wireless Asymmetric Links". Departament de Matematica Aplicada i Telematica, Universititat Politecnica de Catalunya, Barcelona, Spain.

Hari Balakrishnan, et al. "The Effects of Asymmetry on TCP Performance". Computer Science Division, Department of EECS, University of California at Berkeley.

* cited by examiner

*Primary Examiner*—Ario Etienne
*Assistant Examiner*—Abdullahi E. Salad
(74) *Attorney, Agent, or Firm*—Nath & Associates PLLC; Harold L. Novick; Marvin C. Berkowitz

(57) ABSTRACT

Conventional approaches or communications systems for data communications in an asymmetric network connection are disclosed. These approaches or systems relate to the problems posed by the difference in bandwidth between the downstream and upstream channels in the asymmetric network connection. In accordance with the invention, a method, a computer product and a communications system in relation to data communications in an asymmetric network connection are disclosed. The data communications is in accordance with a communications protocol wherein a receiver transmits acknowledgement packets for acknowledging data packets transmitted by a sender. The invention includes the step of measuring the interval between the transmission of data from one of the receiver and sender and the reception of a response thereto by the one of the receiver and sender. Additionally, the invention includes the step determining a window size indicative of the maximum number of the data packets transmittable by the sender for a duration absent any reception of the acknowledgement packets by the sender for the duration in accordance with the communications protocol, wherein the window size is determined using the measured interval. Further, the invention includes the step of regulating the frequency of transmission of the acknowledgement packets from the receiver, the regulation dependent on the determined window size.

12 Claims, 13 Drawing Sheets

Fig. 2

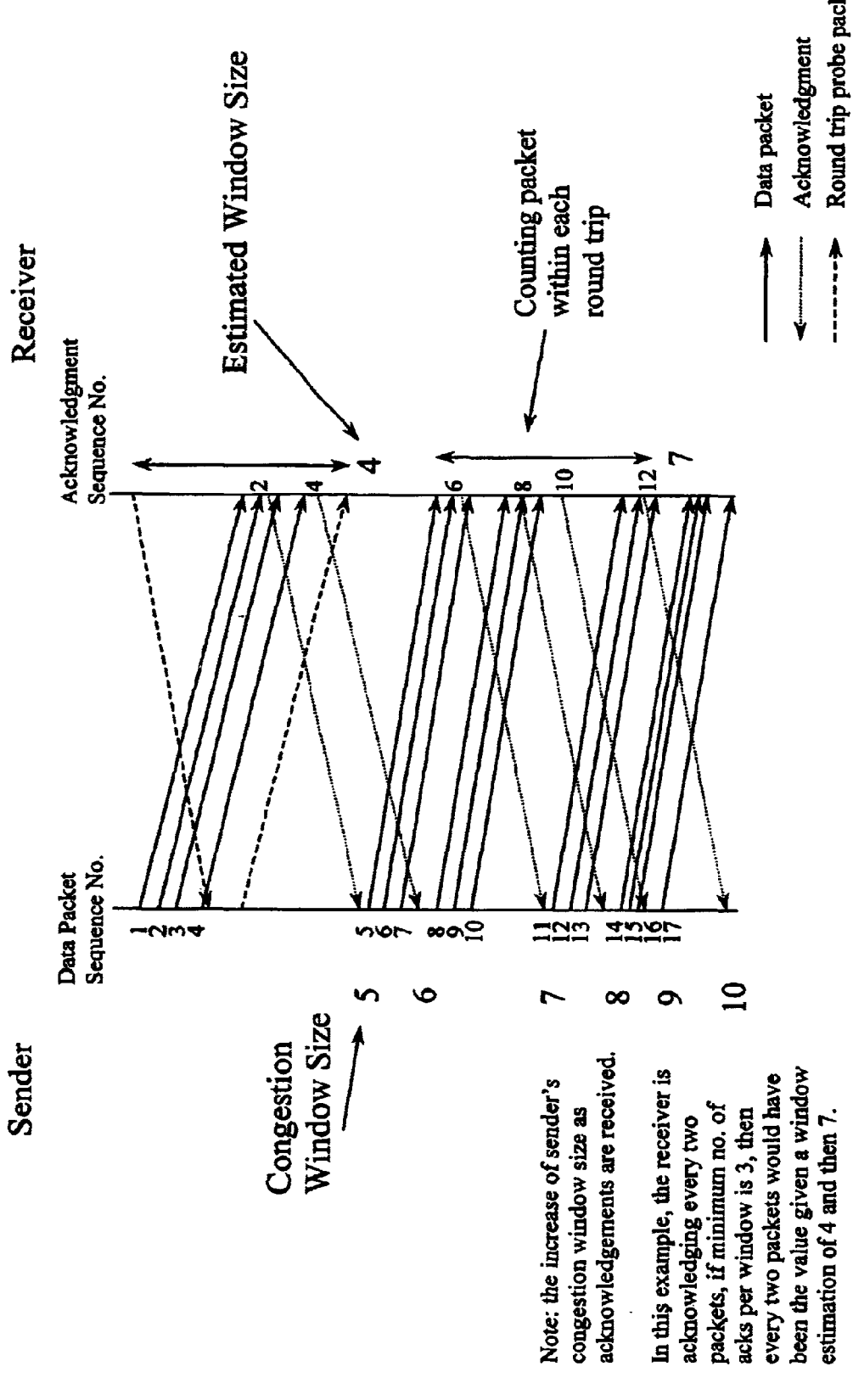

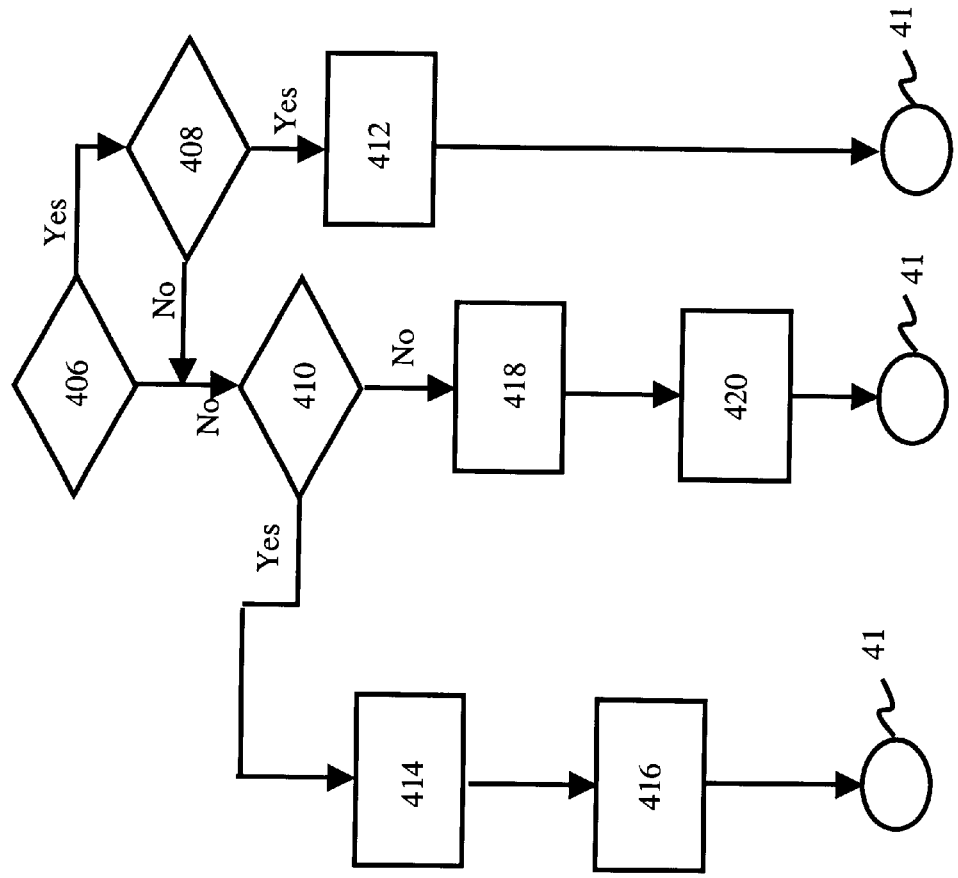
Fig. 4B - Measure Round Trip Time
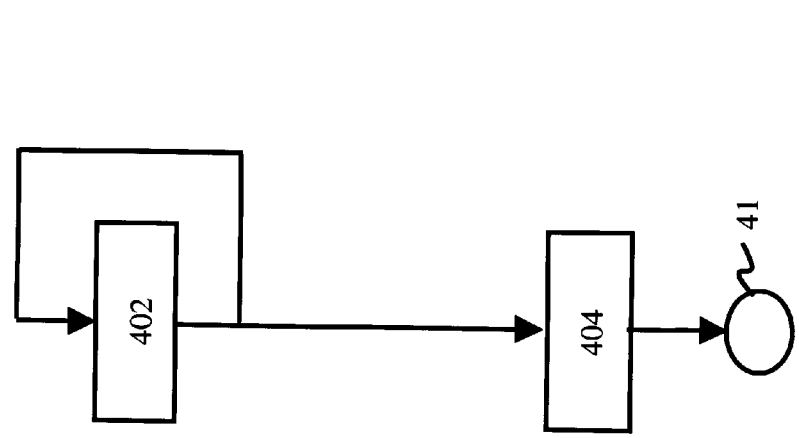
Fig. 4A - Round Trip Time Estimation

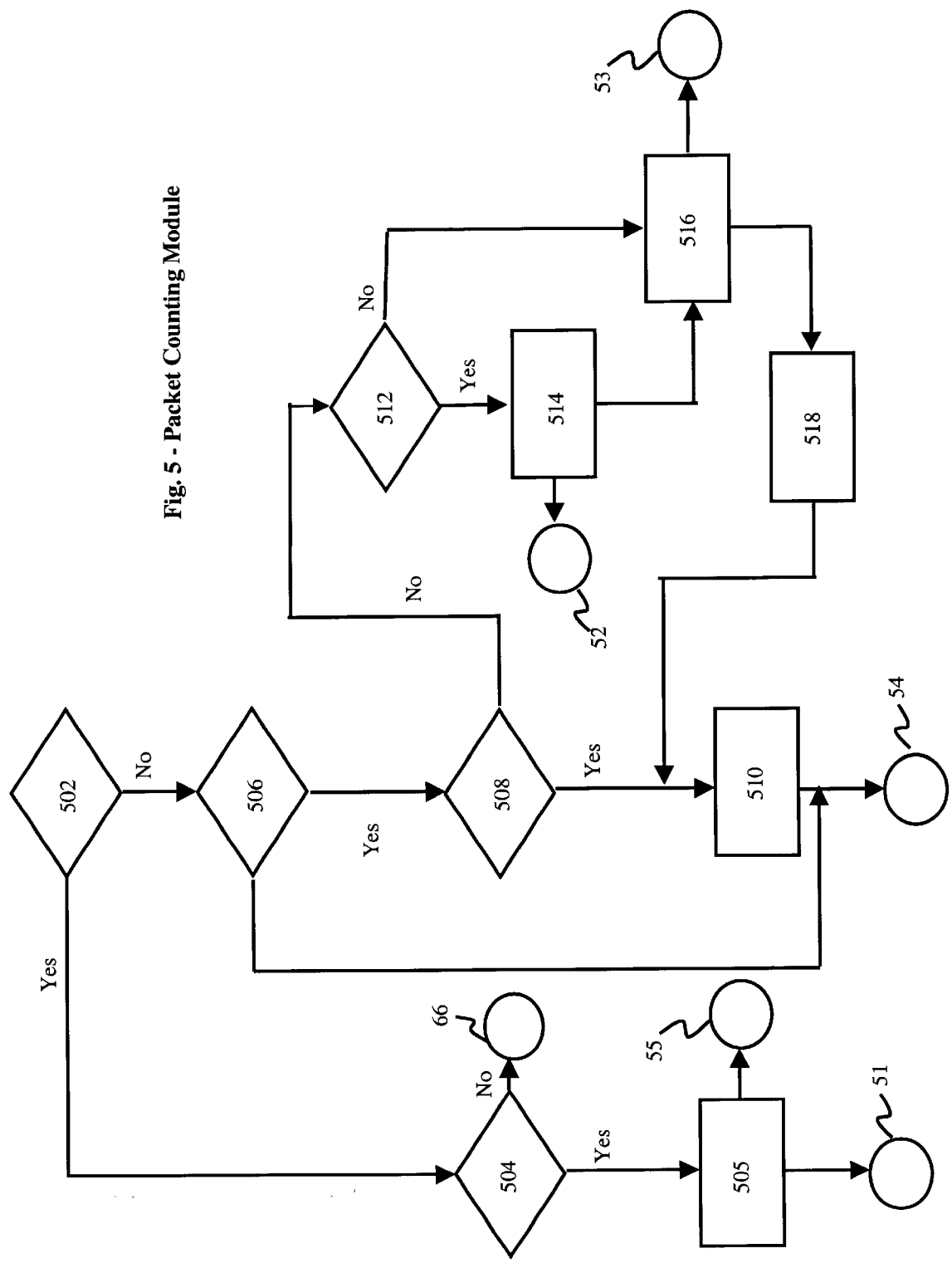

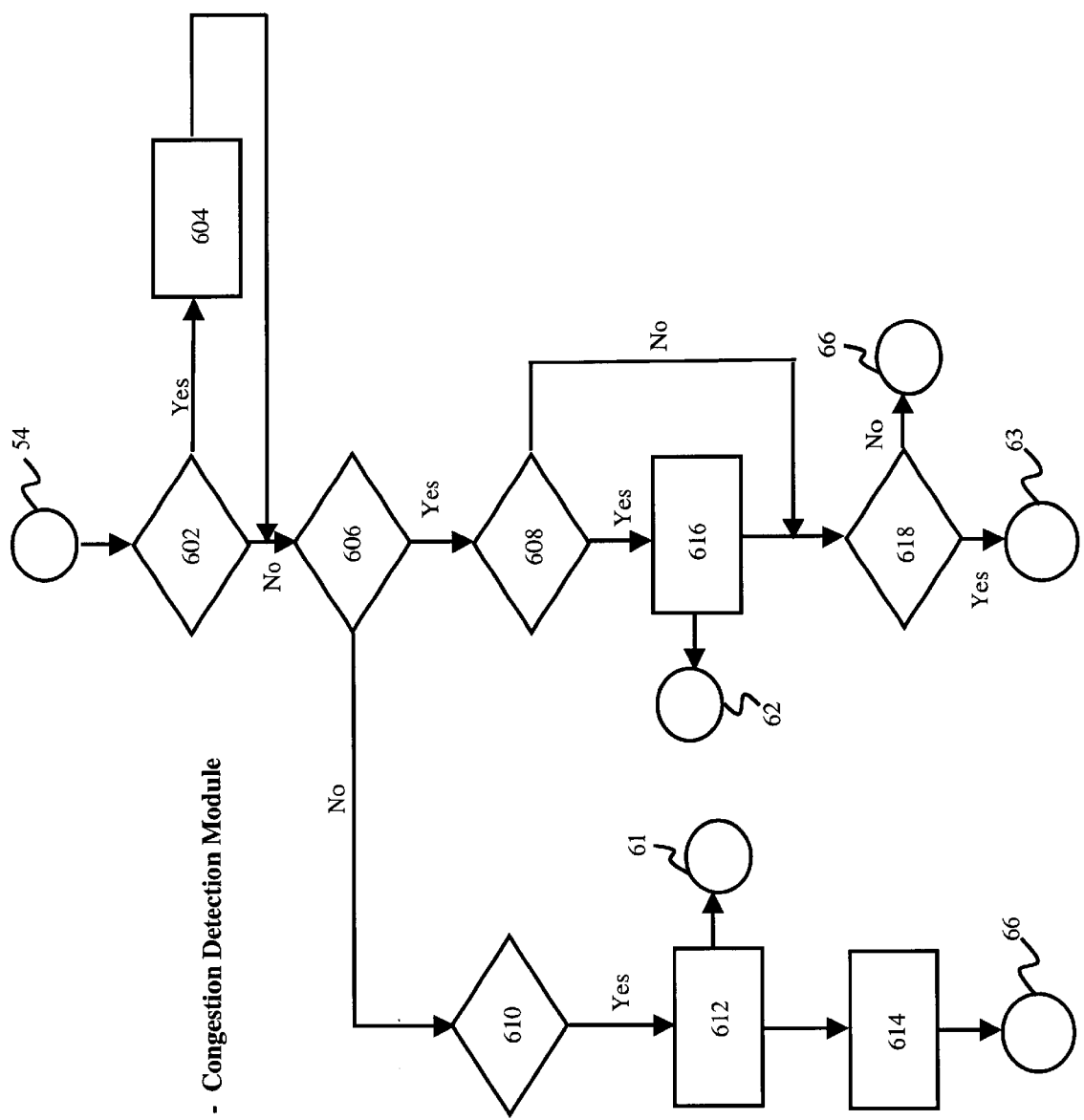
Fig. 6 - Congestion Detection Module

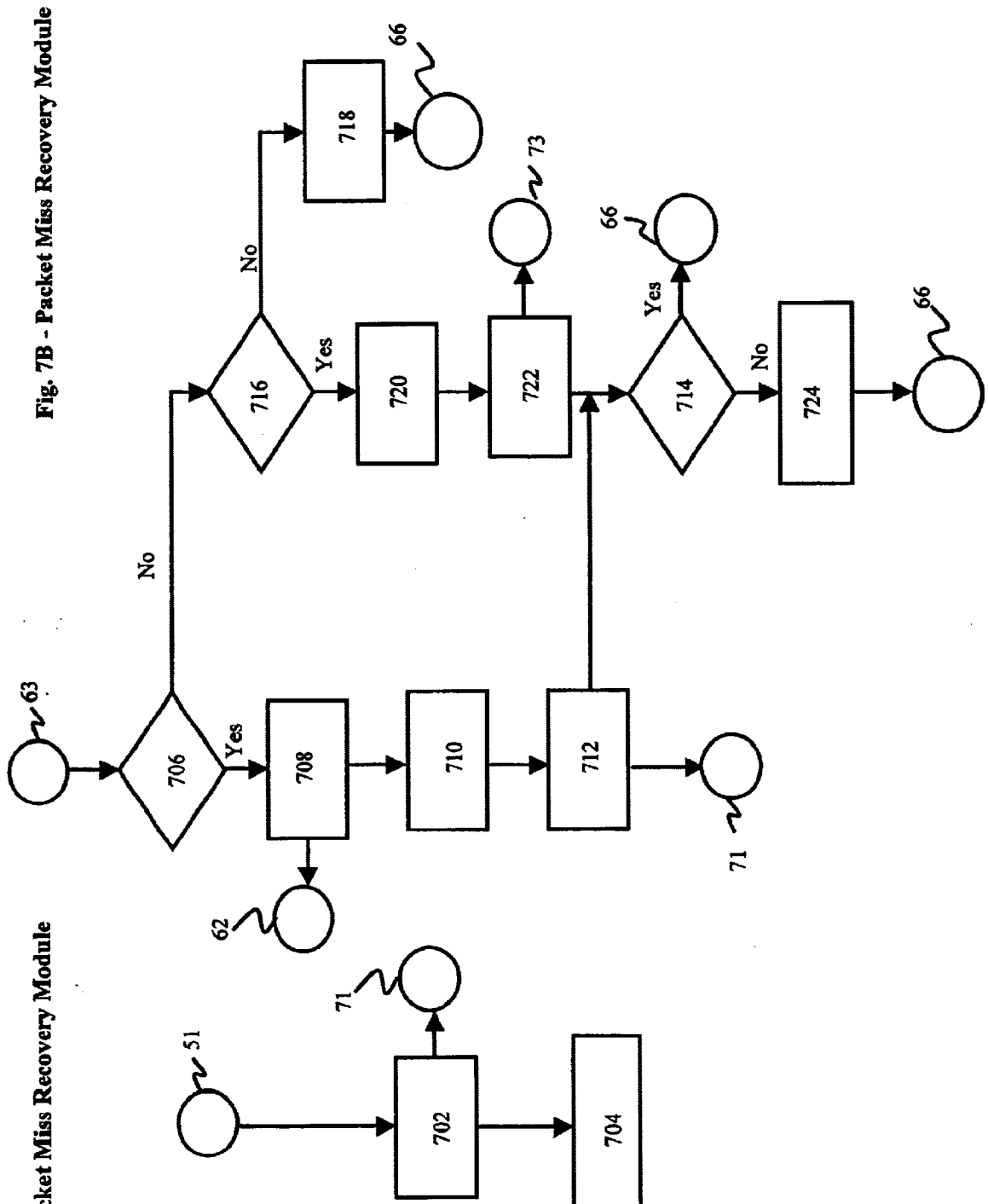
Fig. 7A - Packet Miss Recovery Module
Fig. 7B - Packet Miss Recovery Module

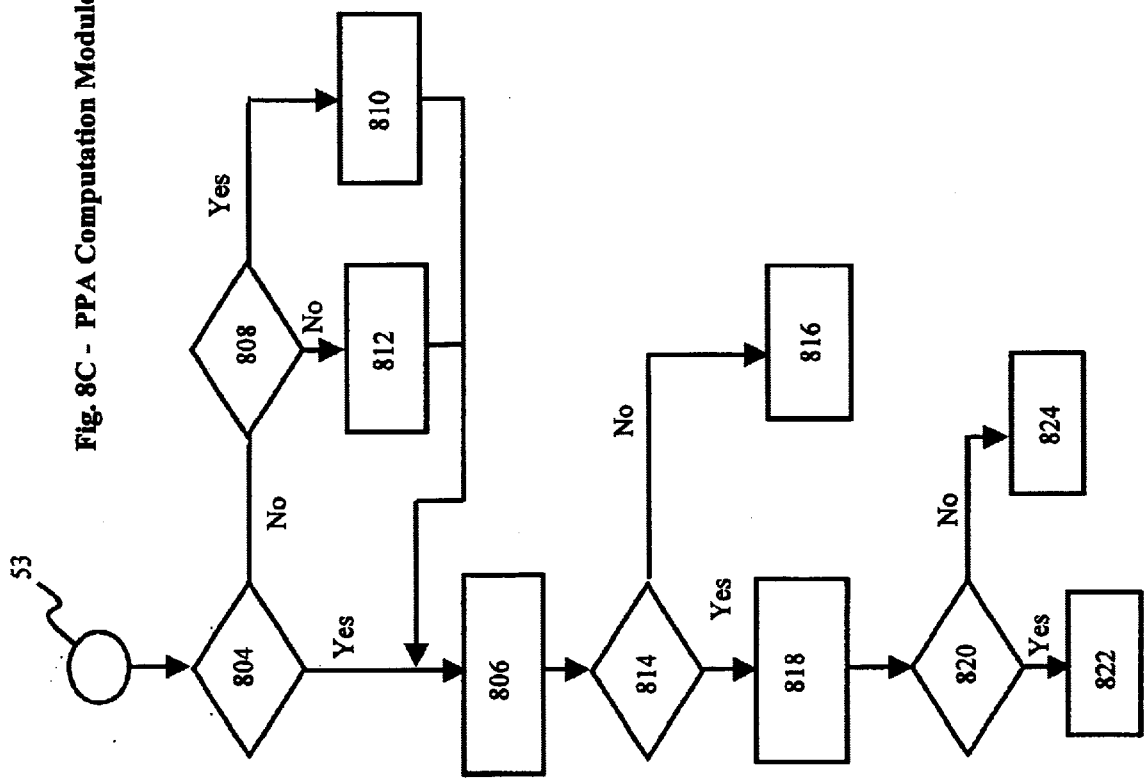
Fig. 8C - PPA Computation Module
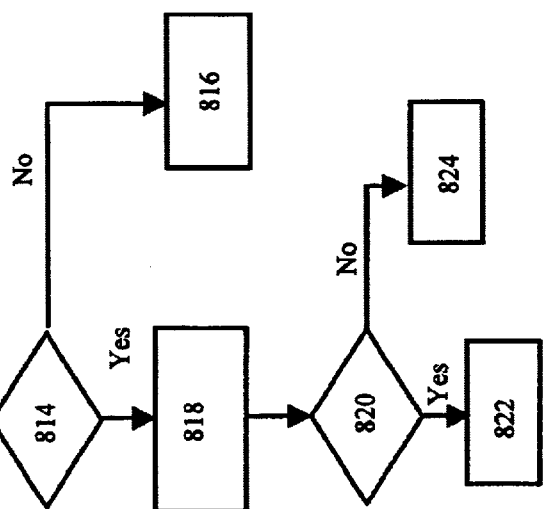
Fig. 8B - PPA Computation Module
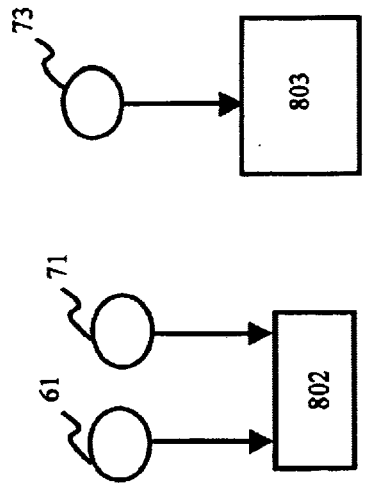
Fig. 8A - PPA Computation Module

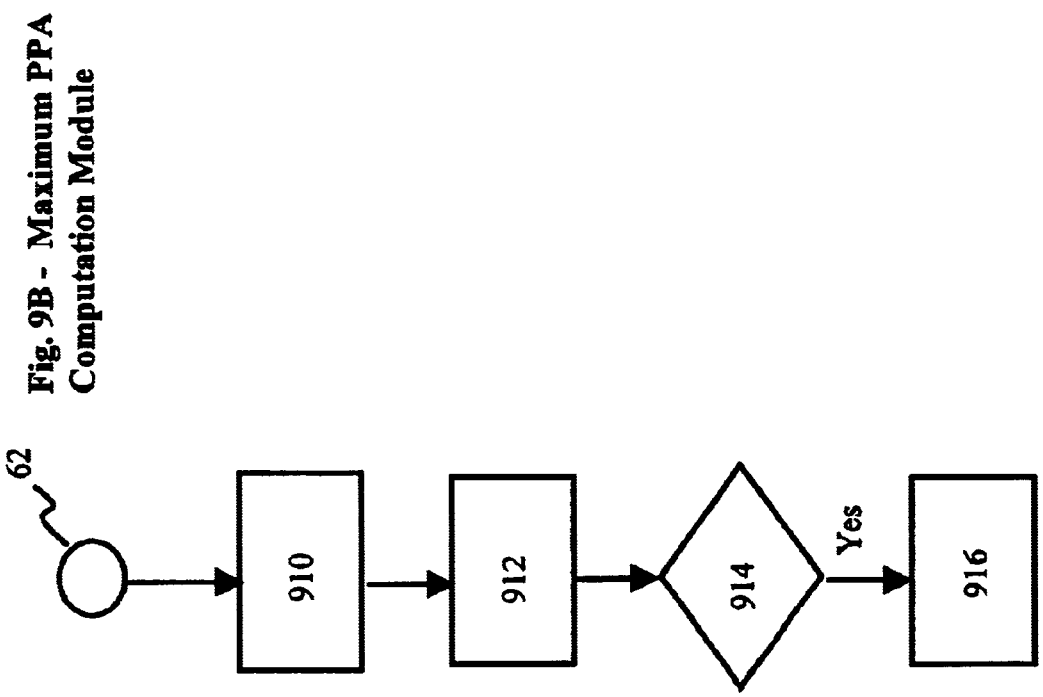
Fig. 9B - Maximum PPA Computation Module
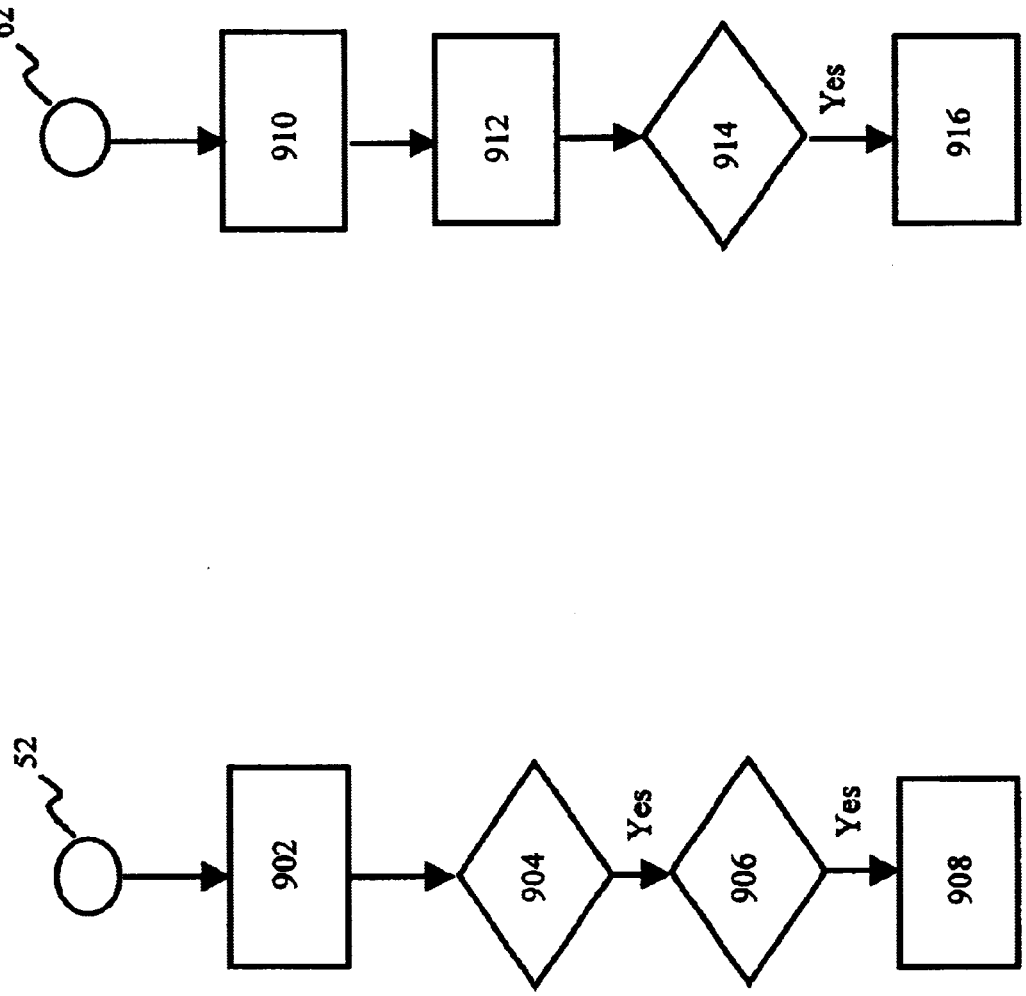
Fig. 9A - Maximum PPA Computation Module

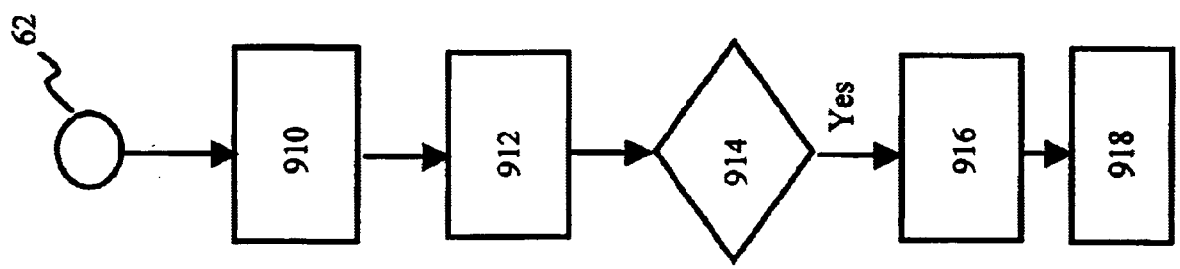
Fig. 9C – Maximum PPA Computation Module – Alternative Embodiment

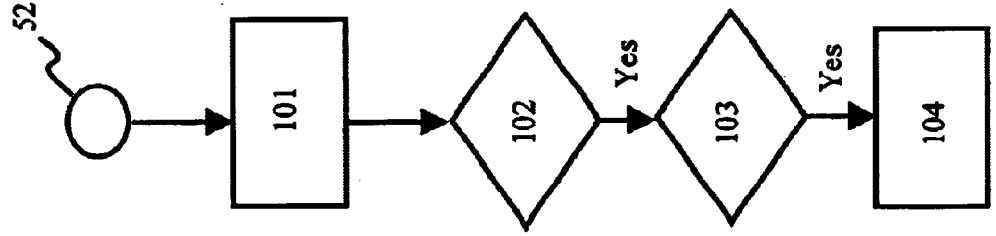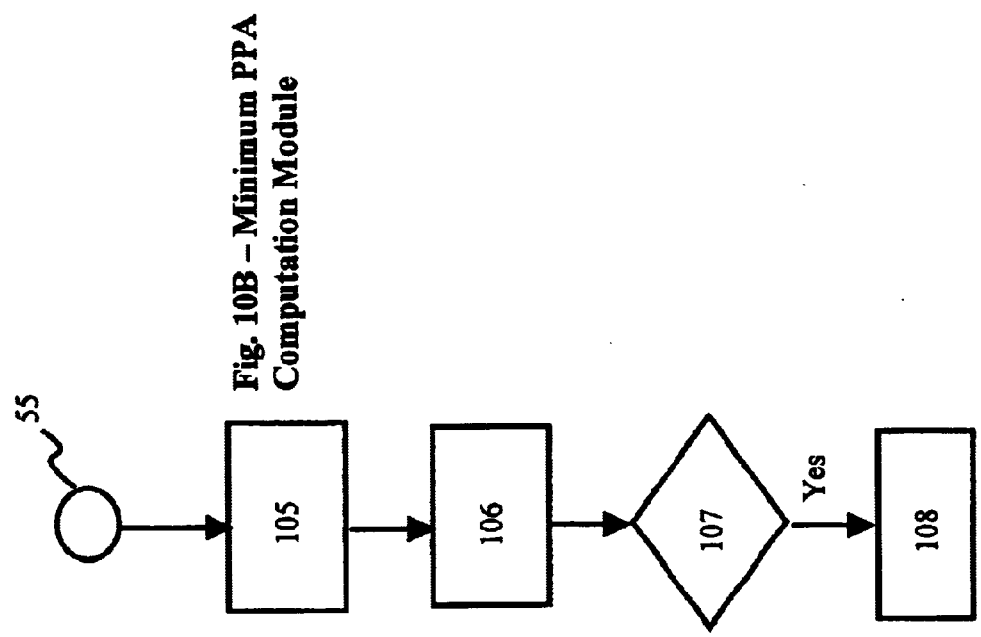

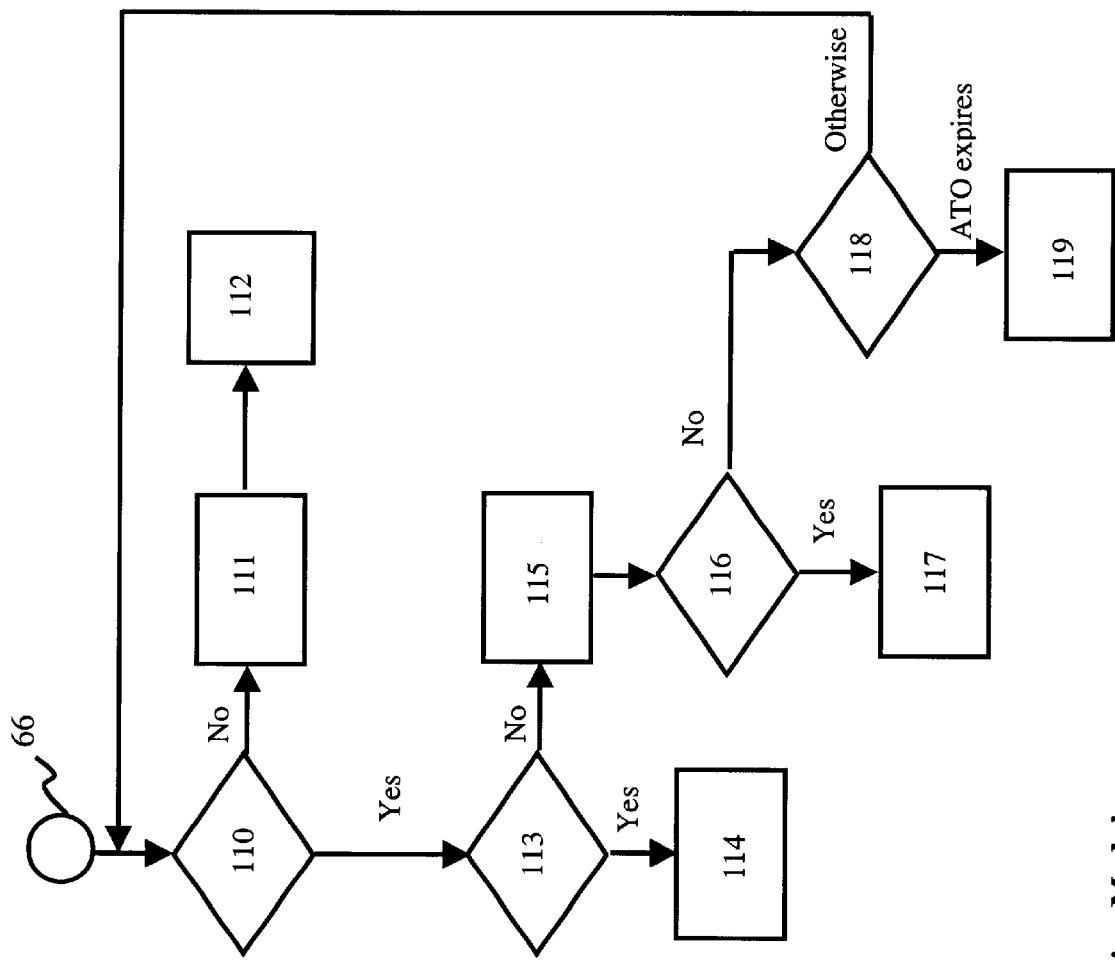
Fig.11 - ACK Generation Module

DYNAMICALLY DELAYED ACKNOWLEDGEMENT TRANSMISSION SYSTEM

FIELD OF THE INVENTION

The present invention relates generally to the field of data communication. In particular, the present invention relates to data communication involving the Transmission Control Protocol (TCP) where acknowledgement transmissions by the receiving entity are dynamically delayed in response to the congestion window size of a sending entity that is connected to the receiving entity via an asymmetric connection.

BACKGROUND

Currently, practically all forms of information exchange and communication subsist on data communication. For example, data communication is a necessary operation in the transmission of facsimile documents. Another important example of the ubiquity of data communication is the Internet where data communication is vital in enabling large files to be downloaded from Web sites to an Internet surfer's computer. A further example of the indispensability of data communication can be seen in its application in network technology. In a network of computers, the computers communicate with each other through data communication.

Hence, it is clear that the operation of all these systems fundamentally depend on data communication. The speed of data communication translates into the speed of information exchange and communication. Therefore, faster data communication means faster information exchange and communication.

Typically, the process of transmitting information across a network connection between computers using data communication involves a two-way transmission of data. When a sending entity wishes to send information to a receiving entity, the sender's computer, which is connected to the receiver's computer through the network connection, initiates a sequence of communication processes that involve the processing of the information. The processing of information usually includes the breaking up of information into packets of data. These data packets are transmitted to the receiver's computer through the network's connection between the computers. Upon receiving these data packets, the receiver computer assembles these data packets into the same information that the sender intended for the receiver to receive.

Upon the arrival of these data packets at the receiver's computer, the receiver's computer acknowledges to the sender's computer that the receiver's computer has received the data packets. The receiver's computer does this by sending packets of data that are known as acknowledgement packets. These acknowledgement packets are transmitted in response to the data packets received by the receiver's computer.

A common and typical way of breaking up information on the sender's computer and, re-forming the same information on the receiver's computer is through the use of the Transmission Control Protocol (TCP). The TCP is a communication protocol that is widely used within the Internet domain for the above purposes of breaking up information and re-forming information on the sender and receiver's computers, respectively. An example of a sender's computer is a server for a web site. An example of a receiver's computer is an Internet surfer's computer. The TCP communication protocol is implemented on both the sender and receiver's computers. The TCP communication protocol is also responsible for causing acknowledgement packets to be transmitted in response to data packets received by the receiver's computer.

The TCP communication protocol is an end-to-end reliable transport protocol.

The TCP communication protocol is also known as a "gentleman" communication protocol, because this protocol provides for data communication between computers of the sender and receiver while having regard to congestion conditions in the Internet. TCP does this by allowing the sender's computer to start transmission only with small numbers of data packets. As the 'sender's computer receives acknowledgement packets from the receiver's computer, indicating the successful transmission and reception of the earlier transmitted data packets, the sender's computer is allowed to increase the number of data packets that the sender's computer can transmit subsequently. For example, the sender's computer starts by transmitting one data packet to the receiver's computer. Upon receiving an acknowledgement packet from the receiver's computer acknowledging the one data packet that was transmitted, the sender's computer transmits two further data packets to the receiver's computer. As the sender's computer transmits the data packets to the receiver's computer, the sender's computer using the TCP communication protocol monitors the number of data packets transmitted and constantly updates a parameter inherent to the TCP communication protocol known as the congestion window size. Hence, when the congestion window size is set to one, the sender's computer transmits one packet of data to the receiver's computer. When the sender's computer receives an acknowledgement packet from the receiver's computer in response to that one data packet transmitted earlier, the congestion window size is increased to two. With an increased congestion window size, the sender's computer is allowed to transmit, and therefore transmits, two data packets. When the receiver's computer receives the two data packets, the receiver's computer acknowledges each of the two data packets by consecutively transmitting two acknowledgement packets. For each acknowledgement packet received by the sender's computer, the congestion window size is increased by one. Hence, upon receiving the two consecutively transmitted acknowledgement packets from the receiver's computer, the congestion window size is raised to four. By this arrangement, the TCP communication protocol imposes on the sender's computer a condition that the congestion window size increases exponentially as the sender's computer continues to transmit data packets and receive acknowledgement packets in response to those data packets. This exponentially increasing behavior of the congestion window size is known as the slow start stage of the data communication process between the sender and receiver's computers. However, as mentioned hereinbefore, the TCP communication protocol is a gentleman's communication protocol. Therefore the TCP communication protocol cannot allow the sender's computer to exponentially increase the number of data packets that the sender's computer transmits infinitely because this causes congestion in the network connection between the sender and receiver's computers. The TCP communication protocol participates in congestion control by setting a value that dictates the maximum congestion window size before the growth rate of the congestion window size slows down. This value is known as the Slow Start Threshhold (SSTHRESH) value.

When the sender's computer's congestion window size reaches the SSTHRESH value, the congestion window size grows linearly, i.e., by one each time a "window" full of acknowledgement packets are received. The ultimate size that the congestion window size can grow to is limited by the transmission buffer in the receiver's computer. When the sender's computer does not receive acknowledgement packets within a certain time from the receiver's computer for the data packets received in that window, the sender's computer times out and consequently retransmits lost data packets. The sender's computer also reduces the congestion window size to 1. This means that as the data communication between the sender and receiver's computers continues, the sender's computer resumes data communication by transmitting one data packet to the receiver's computer. In the same manner as described above, the congestion window size exponentially increases. However, through a congestion control mechanism inherent to the TCP communication protocol, the SSTHRESH value reduces to half of the previous congestion window size.

Hence, when the exponentially increasing congestion window size reaches the new SSTHRESH value, the TCP communication protocol stops increasing the congestion window size by one for each acknowledgement packet received. Instead, the congestion window size is increased by one only when one window full of acknowledgement packets are received collectively. Using the previous example when the congestion window size is raised to four, and the new SSTHRESH value is four, the sender's computer transmits four data packets and waits for four acknowledgement packets in response to those earlier transmitted four data packets. If there is no congestion in the network connection between the sender and receiver's computers, and none of the four data packets are lost in the connection, the receiver's computer receives these four data packets. In response to these four data packets, the receiver's computer generates four acknowledgement packets and transmits these four acknowledgement packets to the sender's computer. When the sender's computer receives these four acknowledgement packets, instead of increasing the congestion window size each time one acknowledgement packet is received, the sender's computer increases the congestion window size by one only when all four acknowledgement packets are received. Alternatively, the sender's computer may increase the congestion window size by one-fourth each time one acknowledgement packet is received, thereby achieving the same effect. By doing this, the TCP communication protocol ensures that the rate of increase of data packets transmitted by the sender's computer is linear. This stage is known as the congestion avoidance stage.

Currently, the TCP communication protocol adequately meets general network performance requirements when the network connection between the sender and receiver's computers is symmetric. That is, the sender's computer transmits information to the receiver's computer, i.e. downstream transmission, at the same rate that the receiver's computer transmits information to the sender's computer, i.e. upstream transmission. However, currently, there are many network connections that are asymmetric in nature. That is, the downstream transmission occurs at a faster rate than the upstream transmission. One reason for this is that the bandwidth allocation in the network connections is not equal. That is, the downstream transmission bandwidth is greater than the upstream transmission bandwidth. Another reason for this is that the receiver's computer usually has limited transmission resources. For example, a transmission buffer in the receiver's computer, in which acknowledgement packets and other outgoing data packets are stored prior to transmission has limited size. Therefore, if the receiver's computer is communicating with several other computers, the sender's computer being one of them, the transmission buffer in the receiver's computer may be substantially filled. Hence, an acknowledgement packet generated by the receiver's computer in response to a data packet transmitted by the sender's computer may be placed in a queue in the transmission buffer. This queue may be long and therefore the acknowledgement packet may be kept in the transmission buffer for a considerable period of time before the acknowledgement packet is transmitted to the sender's computer. In a worst-case scenario, where the transmission buffer is already full before the receiver's computer generates the acknowledgement packet, the acknowledgement packet is not placed in the queue. When this happens, the receiver's computer does not transmit the acknowledgement packet to the sender's computer at all. As a result the sender's computer, after a futile wait for an acknowledgement for a specified period, re-transmits the data packet.

If the upstream transmission rate is slower than the downstream transmission rate, the overall transmission rate accords with the upstream transmission rate. That is, the upstream transmission rate dictates the overall transmission rate. This is because, as described hereinbefore, any process of sending information includes the processes of transmitting data packets by the sender's computer and acknowledging the reception of these data packets by the receiver's computer. If the acknowledgement process is slow, the direct consequence is a slow process of transmission of data packets.

To overcome this problem, there are a number of commercial systems available in the market currently. These systems propose to alleviate the problem by compensating the slower upstream transmission rate with fewer acknowledgement packets. These approaches may be useful, provided there are no adverse effects. For example, an approach is not a good one if the TCP communication protocol requires an overhaul. As another example, an inadequate approach is one that in attempting to solve the problem of a slower upstream transmission rate affects the downstream transmission by causing bursty downstream transmission. Bursty downstream transmission is adverse, because the bursty transmission contributes to congestion in the network connection.

One prior art system proposes a collapsible transmission buffer or "ACK filtering" concept. The system operates as follows: each data packet transmitted by the sender's computer has a sequence number. The corresponding acknowledgement packet transmitted by the receiver's computer also has a sequence number. If one data packet is transmitted earlier than another data packet, the earlier data packet is allocated a smaller sequence number than that later generated data packet. Similarly, if an acknowledgement packet is transmitted earlier than another, the earlier acknowledgement packet is allocated a smaller sequence number than the later generated acknowledgement packet. In this approach, the transmission buffer in the receiver's computer is modified so that acknowledgement packets having larger sequence numbers than the acknowledgement packets already queuing in the transmission buffer replace the acknowledgement packets in the queue.

The basis for such a proposal is that the TCP communication protocol is designed to recognize that the reception of acknowledgement packets with larger sequence numbers indicates that the data packets with smaller sequence numbers transmitted by the sender's computer have been successfully received by the receiver's computer. These acknowledgement packets with larger sequence numbers also provide information that the data packets with the corresponding larger sequence numbers transmitted by the sender's computer have also been successfully received by the receiver's computer.

In addition, the congestion window size in the sender's computer is set to a value that accords with the latest acknowledgement packets. This may cause the sender's computer to transmit a burst of data packets following the acknowledgement, which may undesirably contribute to congestion in the network connection. A further significant disadvantage of this conventional system is that modification needs to be made to the receiver's computer at the lower data-link communication protocol that manages the transmission buffer, or that of a modem that connects the receiver's computer to a network.

A variation of this prior art system attempts to alleviate the problem of bursty transmission through the intervention of a router. A router is one of many network elements that form part of the network connection between the sender and receiver's computers. One of the router's functions is to route data. In this system variation, a router is tasked to regenerate acknowledgement packets. However, this router must be one that forms a symmetric connection with the sender's computer. The acknowledgement packets that are regenerated by the router are those acknowledgement packets that have been replaced by the acknowledgement packets with larger sequence numbers in the transmission buffer of the receiver's computer. One consequential problem of this system variation is that it is necessary to modify the router. The router has to be modified to recognize that acknowledgement packets with larger sequence numbers have replaced acknowledgement packets queuing in the transmission buffer of the receiver's computer. This recognition process requires the router to have a memory dedicated to tracking the sequence numbers of data packets that have passed through the router to reach the receiver's computer. Modifications as such are generally complex in nature and are not desirable, since routers are integral elements of the network to which the sender and receiver's computers are connected. The modifications, therefore, are highly impractical for cost and complexity reasons.

Another prior art system proposes that the sender's computer provide information to the receiver's computer in relation to the congestion situation in the network connection. In one instance, this information consists of the current congestion window size of the sender's computer. The sender's computer provides the current congestion window size to the receiver's computer via the data packets that the sender's computer transmits to the receiver's computer. For example, when the sender's computer transmits a data packet to the receiver's computer, the sender's computer appends to that data packet information on the current congestion window size. When the receiver's computer receives this data packet with the information on the current congestion window size, the receiver's computer is able to use this information to determine the number of subsequent data packets that the receiver's computer would wait to receive before the receiver's computer acknowledges these data packets.

Having knowledge of the sender's computer's current congestion window size, the receiver's computer is able to calculate the number of data packets that the receiver's computer must wait before transmitting an acknowledgement packet. In general, having a larger congestion window size means that the sender's computer can send more data packets before having to stop and wait for an acknowledgement. Therefore, the receiver's computer can transmit acknowledgement packets more sparingly. This directly implies that the receiver's computer can wait for more data packets to arrive before transmitting an acknowledgement. The direct impact is that lower upstream bandwidth is required by the receiver's computer.

In another instance, where the concept of Acknowledgement Congestion Control (ACC) is proposed, a router in the network connection between the sender and receiver's computers provides information on the congestion situation in the network connection instead of the sender's computer. The ACC concept relies on the fact that those data or acknowledgement packets contain unused bits that may be set by a router when such packets pass through that router. Hence, if a router handling the upstream transmission has knowledge of the congestion situation in the network connection, the router is able to appropriately report the congestion situation by the use of these unused bits. In situations where the router is aware that there is congestion in the network connection, the router sets an ECN bit in the acknowledgement packets that pass through the router. When the sender's computer receives these acknowledgement packets, with the ECN bits set, the sender's computer replicates the ECN bit in the data packets that the sender's computer subsequently transmits to the receiver's computer. The receiver's computer, upon receiving data packets with the ECN bits sets therefore can infer that there is upstream transmission congestion. With knowledge of this upstream transmission congestion, the receiver's computer can thus appropriately reduce the number of acknowledgement packets to be transmitted to the sender's computer. Although this proposal is an elegant solution, the problem of bursty downstream transmission is not addressed.

In the above two instances, complex modifications need to be made to some communication elements that are involved in the data communication between the sender and receiver's computers. For example, in the first instance, the TCP communication protocols on both the sender and receiver's computers must be modified. The TCP communication protocol on the sender's computer must be modified to include the current congestion window size information in the data packets that the sender's computer's transmits. The TCP communication protocol in the receiver's computer must be modified so that the receiver's computer can have regard to the current congestion window size information appended to the data packets when the receiver's computer is generating acknowledgement packets in response to these data packets.

In the second instance, more communication elements in the network connection between the sender and receiver's computers require modification. The TCP communication protocols in the sender and receiver's computers, and the routers in the network connection between the sender and receiver's computers must be modified. The routers must be modified so that any congestion situation in the network connection between the sender and receiver's computers is monitored. In the event that there is a congestion problem, the router must be able to set the ECN bit in the acknowledgement packets transmitted by the'sender's computer. The TCP communication protocol on the sender's computer must be modified to check the ECN bit in every acknowledgement packet transmitted by the receiver's computer. If the router sets the ECN bits in the acknowledgement, the TCP communication protocol in the sender's computer must replicate these ECN bits in the subsequent data packets that the sender's computer transmits to the receiver's computer. The TCP communication protocol on the receiver's computer must also be modified so that the receiver's computer recognizes and takes into account the information provided by the setting of the ECN bits in data packets transmitted by the sender's computer's.

It is clear from the above prior art proposed solutions that a need exists for a simpler solution to the problems related to an asymmetric network connection. The desirable effects of this solution should provide that the slower upstream transmission is compensated by transmission of fewer acknowledgement packets transmitted by the receiver's computer. The solution should also address the issue of bursty downstream transmission. Most importantly however the solution should be a simple one so that any effect the solution has on the network elements of network connection between the sender and receiver's computers is minimal.

SUMMARY

Various aspects of the invention are directed to ameliorating or overcoming one or more disadvantages of current approaches. In particular, the aspects of the invention are directed to addressing the disadvantages associated with slow upstream transmission rates of asymmetric network connections. Also, the aspects of the invention overcome the disadvantages associated with the need for manifold modifications to the network elements of the network connection between the sender's computer and receiver's computer. Furthermore, the aspects of the invention are directed to reducing bursty downstream transmission of the network connection between the sender and receiver's computer when congestion is detected in the network.

In accordance with a first aspect of the invention there is disclosed a method of data communications in an asymmetric network connection according to a communications protocol wherein a receiver transmits acknowledgement packets for acknowledging data packets transmitted by a sender, the method including the steps of measuring the interval between the transmission of data from one of the receiver and sender and the reception of a response thereto by the one of the receiver and sender; determining a window size indicative of the maximum number of the data packets transmittable by the sender for a duration absent any reception of the acknowledgement packets by the sender for the duration in accordance with the communications protocol, wherein the window size is determined using the measured interval; and regulating the frequency of transmission of the acknowledgement packets from the receiver, the regulation dependent on the determined window size.

In accordance with a second aspect of the invention there is disclosed a computer program product for data communications in an asymmetric network connection according to a communications protocol, including a computer usable medium having computer readable program code means embodied in he medium for causing data communications wherein a receiver transmits acknowledgements for acknowledging data packets transmitted by a sender, the computer program product having computer readable program code means for measuring the interval between the transmission of data from one of the receiver and sender and the reception of a response thereto by the one of the receiver and sender; computer readable program code means for determining a window size indicative of the maximum number of the data packets transmittable by the sender for a duration absent any reception of the acknowledgement packets by the sender for the duration in accordance with the communications protocol, wherein the window size is determined using the measured interval; and computer readable program code means for regulating the frequency of transmission of the acknowledgement packets from the receiver, the regulation dependent on the determined window size.

In accordance with a third aspect of the invention there is disclosed a communications system in an asymmetric network connection according to a communications protocol wherein a receiver transmits acknowledgement packets for acknowledging data packets transmitted by a sender, the communications system including a timer for measuring the interval between the transmission of data from one of the receiver and sender and the reception of a response thereto by the one of the receiver and sender; a counter for determining a window size indicative of the maximum number of the data packets transmittable by the sender for a duration absent any reception of the acknowledgement packets by the sender for the duration in accordance with the communications protocol, wherein the window size is determined using the measured interval; and a generator for regulating the frequency of transmission of the acknowledgement packets from the receiver, the regulation dependent on the determined window size.

BRIEF DESCRIPTION OF THE DRAWINGS

Embodiments of the invention are described hereinafter with reference to the drawings, in which;

FIG. 3 is timing diagram illustrating the timing and the sequence of transmission of data packets and acknowledgements packets between the sender and receiver's computers, shown in FIG. 1;

FIG. 4 is a flow diagram illustrating the process of estimating the round trip time in the TCP communication protocol, shown in FIG. 2;

FIG. 5 is a flow diagram illustrating the Packet Counting module 14;

FIG. 6 is a flow diagram illustrating the Congestion Detection module;

FIG. 7 is a flow diagram illustrating the Packet Miss Recovery module 20a;

FIG. 8 is a flow diagram illustrating the packet per acknowledgement (PPA) computation module;

FIG. 9 is a flow diagram illustrating the Maximum PPA Computation module 18b;

FIG. 10 is a flow diagram illustrating the Minimum PPA Computation module 18a (optional);

FIG. 11 is a flow diagram illustrating the packet acknowledgement module; and

DETAILED DESCRIPTION

Figure 1:
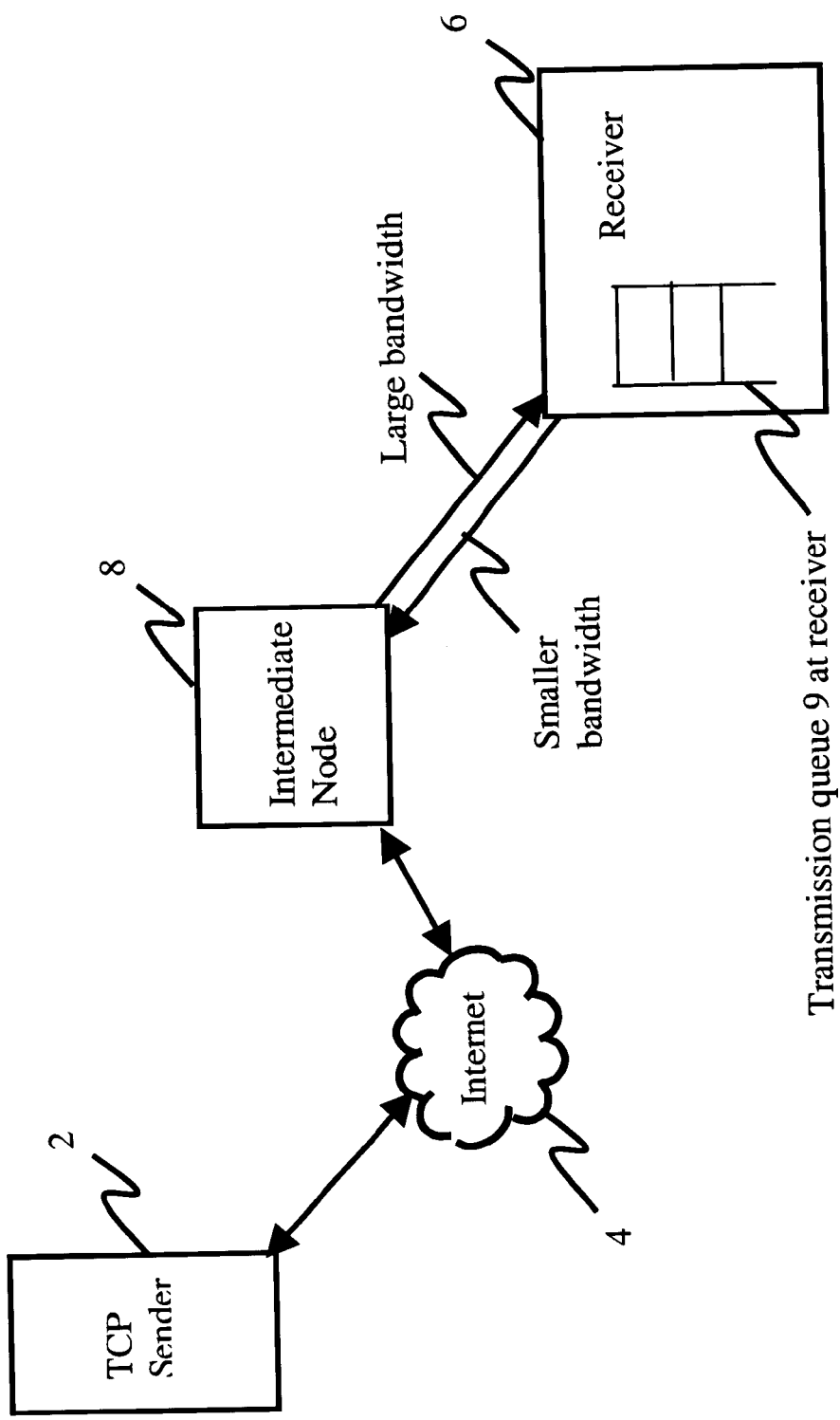
FIG. 1 is a high-level block diagram illustrating a network connection between a sender's computer and a receiver's computer.

A method, a device, a system and a computer program product for providing dynamically delayed TCP acknowledgement from a computer connected to a network are described. In the following description of several embodiments, numerous details such as the International Organization for Standardization Open System Interconnection (ISO/OSI) model, the TCP communication protocol, the Internet, and the like are described in order to provide a more thorough description of these embodiments. It will be apparent, however, to one skilled in the art that the invention may be practiced without those specific details. In other instances, well-known details such as particular types of transmission data generated by the TCP communication protocol in computers, the various ISO/OSI communication protocol layers in computers, and the like have not been described in detail so as not to obscure the invention.

The advantages of the embodiments of the invention are manifold. The TCP communication protocol, in conjunction with the Internet Protocol (IP), forms a TCP/IP communication protocol stack popularly used in the Internet domain. The ISO/OSI model is a layered architecture that standardizes levels of service and types of interaction for computers exchanging information through a network. The TCP communication protocol corresponds to a transport layer in the ISO/OSI model. The IP communication protocol corresponds to a network layer in the ISO/OSI model. Since the Internet explosion in the early 1990s, the TCP/IP communication protocol stack has become the de facto communication protocol stack used in many Internet websites and computers of Internet surfers. The Internet is extremely popular today; many Internet surfers and website providers are actively using the Internet to download and transmit files. As mentioned hereinbefore, a need has arisen to resolve the congestion problem associated with asymmetric connections and the use of the TCP communication protocol as part of the communication protocol stack in the computers of the communicating entities. Because of the popularity and widespread reach of the Internet, however, the solution has to be a practical and simple one. This is because the many Internet surfers that use the Internet are the targeted beneficiaries of this solution. Hence, the embodiments of the invention provide a solution that can be implemented in the Internet surfers' computers easily. Also, the embodiments of the invention provide a solution that does not effect changes to any network element in the Internet other than the Internet surfers' computers.

Internet surfers and website providers are connected to the Internet in many ways. Among the many means to connect to the Internet, asymmetric network connections using cable, Asymmetric Digital Subscriber Link (ADSL) and/or wireless technologies are common. The solution provided by the embodiments of the invention can be used to improve the overall transmission performance of any of these exemplified asymmetric network connections.

Although it appears from the foregoing that the embodiments of the invention are only directed to a solution to the congestion problem associated with asymmetric networks and the use of the TCP communication protocol, it should not be construed that the embodiments of the invention have only such a limited scope of application. The embodiments of the invention are also useful and beneficial when applied to solutions to any congestion problem associated with any type of asymmetric network connection and any type of communication protocol that is similar to the TCP communication protocol in function and behavior.

As opposed to inadequate approaches that exist in the market now, (i.e. techniques that require complex, time-consuming, costly and impractical modifications to the network elements in Internet and the Internet surfers' computers), the embodiments of the invention involve only simple yet cost effective and practical modifications to the TCP communication protocol implementation in an Internet surfers' computer.

The embodiments of the invention provide a solution to the congestion problem by dynamically delaying the transmission of acknowledgement packets (hereinafter known as ACKs) by the TCP communication protocol in the receiver's computer when data packets (hereinafter known as DATs) are transmitted by the sender's computer. The solution ensures that the ACK transmission overhead from the receiver's computer is reduced. This reduction is achieved by having the receiver's computer estimate the round trip time, i.e., the time taken for a packet of data to be sent from the receiver's computer to the sender's computer, and back to the receiver's computer. This estimation is done periodically. Based on the estimated round trip time, the receiver's computer subsequently counts the number of DATs received within a period defined by the estimated round trip time. This count provides an indication of the sender's computer congestion window size.

With the information regarding the estimated round trip time and the indication of the sender's computer congestion window size, the receiver's computer exercises discretion as to when to transmit ACKs. If there is an indication that the sender's computer congestion window size is small, the receiver's computer must transmit an ACK for every DAT received from the sender's computer to build up the sender's computer congestion window size. On the other hand, if there is an indication that the sender's computer congestion window size is large, the receiver's computer transmits ACKs sparingly. That is, the receiver's computer only transmits an ACK for every predetermined number of DATs received from the sender's computer. This predetermined number is determined by dividing the estimated congestion window size with a preset number. The preset number is equal in value to the minimum number of ACKs that the receiver's computer must transmit in one window of DATs received. As a result of fewer ACKs generated by the receiver's computer, the queuing time of the ACKs at the transmission buffer of the receiver's computer is also reduced. Consequently, downstream transmission throughput is increased. With the continuing estimation of the round trip time and monitoring of the sender's computer congestion window size, the TCP communication protocol in the receiver's computer effects discretionary delays of ACK transmission to adapt to the congestion situation in the asymmetric connection.

In addition to computing the number of DATs that the receiver's computer would wait before transmitting a corresponding acknowledgement packet by dividing the estimated congestion window size with a preset number, the embodiments of the invention further limit the value. The limited value is dependent on the frequency of occurrence of the network congestion. The end result or effect is to limit the number of DATs that the receiver's computer would have to wait before transmitting a corresponding acknowledgement packet so that there is appropriate control of the burstiness of DAT transmission.

FIG. 1 shows the context in which the congestion problem associated with an asymmetric connection and the use of the TCP communication protocol exists. The embodiments of the invention can be practiced in this context. A sender's computer 2 is connected to the Internet 4. The sender's computer 2 can be a Website server, for example. A receiver's computer 6 is connected to the Internet 4 via an intermediate node. The intermediate node, for example, can be a cable router or a base station that is used in cable networks and wireless networks, respectively. For purposes of describing the embodiments of invention, the example of a router 8 is used. The router 8 is connected to the Internet 4. The network connections between the sender's computer 2 and the Internet 4 and between the Internet 4 and the router 8 are symmetric. However, the network connection between the router 8 and receiver's computer item 6 is asymmetric, as indicated by two separate unidirectional arrows. As mentioned in the foregoing, an asymmetric connection means that the downstream transmission has a larger bandwidth than the upstream transmission. Hence, even though a large part of the network connection between the sender's computer 2 and the receiver's computer 6 is symmetric, by virtue of the fact that the network connection between the router 8 and the receiver's computer 6 is asymmetric, the connection between the sender's computer 2 and the receiver's computer 6 is considered asymmetric.

Figure 2:
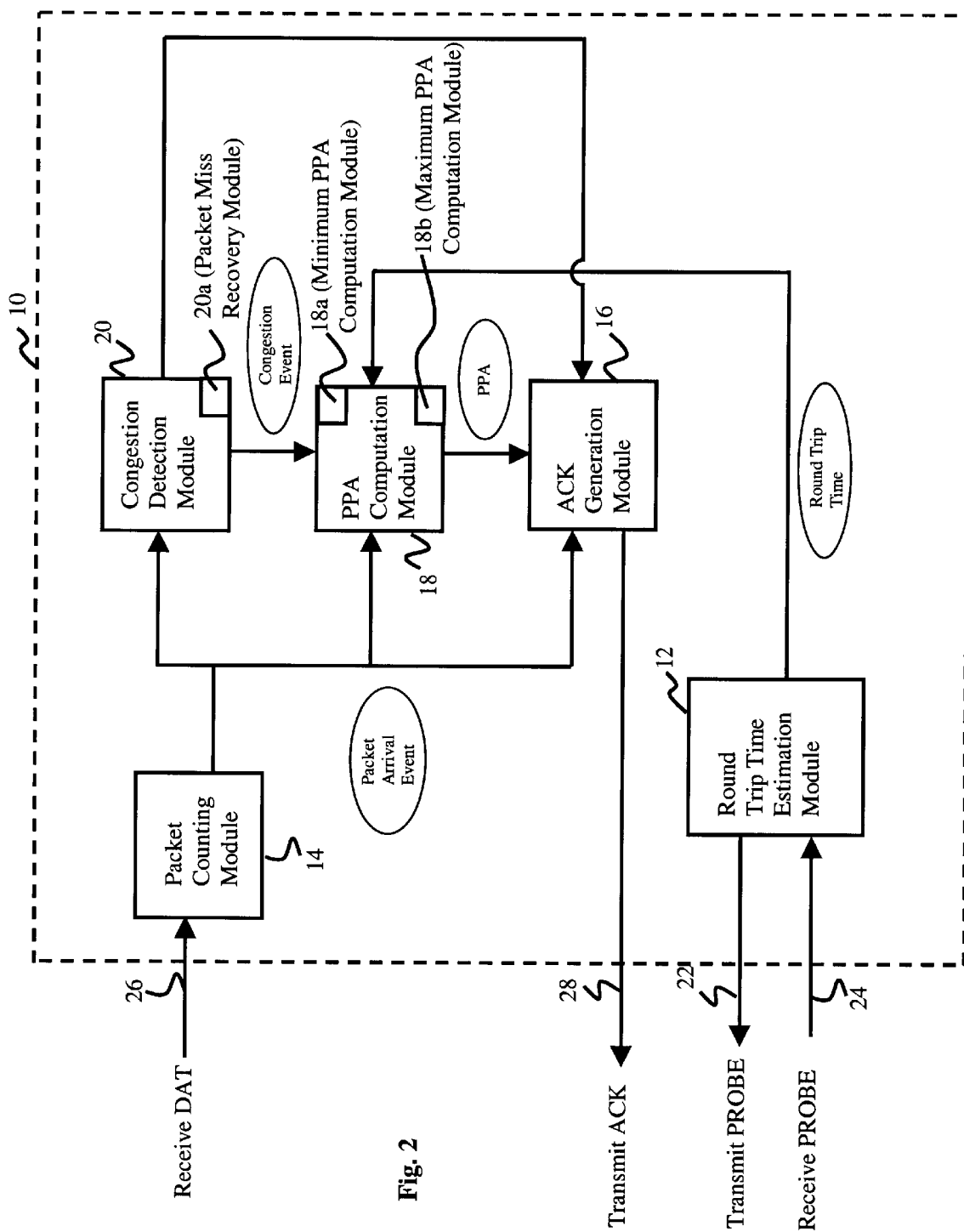
FIG. 2 is a block diagram illustrating the modules in a modified TCP communication protocol in the receiver's computer shown in FIG. 1 in accordance with an embodiment of the invention.

FIG. 2 shows a block diagram representing the working modules in a TCP communication protocol 10 of the receiver's computer 6 shown in FIG. 1 in accordance with a preferred embodiment of the invention. In the description provided hereinafter, components of the embodiments of the invention are described as modules. The modules and in particular their functionality can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the embodiments of the invention can also be implemented as a combination of hardware and software modules.

The TCP communication protocol 10 resides in the receiver's computer 6 typically as the transport protocol in the communication protocol stack that enables the receiver's computer 6 to communicate with other computers. The TCP communication protocol 10 consists mainly of a Round Trip Time Estimation module 12, a packet receiving module 14, an ACK generation module 16, a packet per acknowledgement (hereinafter known as PPA) computation module 18 and a Congestion Detection module 20. These modules are further described in detail hereinafter.

FIG. 2 is a conceptual diagram of the TCP communication protocol 10 whereby the modules are connected by the flow of data and information, thereby connecting the modules in terms of functionality rather than actual hardware connectivity. For example, the Round Trip Time Estimation module 12 uses probe packet (hereinafter known as PROBE) transmission and return paths 22, 24 shown in isolation from the DAT arrival path 26 and the ACK transmission path 28. In practice, the paths share the same input/output (hereinafter known as I/O) resources in the TCP communication protocol 10. That is, the ACK transmission path 28 shares the same I/O resource as the PROBE transmission path 22 and the DAT arrival path 26 shares the same I/O resource as the PROBE return path 24. Hence, to each of the other communication protocols that interact with the TCP communication protocol 10, there is only one transmission I/O resource and only one arrival/return I/O resource.

The PROBE transmission path 22 is a means by which the Round Trip Time Estimation module 12 transmits on behalf of the TCP communication protocol 10 PROBEs into the asymmetric connection to initiate the measurement of the round trip time. The PROBE return path 24 is a means by which the PROBEs return to the TCP communication protocol 10 for the completion of the measurement of the round trip time. The DAT arrival path 26 is a means by which DATs arrive at the TCP communication protocol 10 via the DAT receiving module 14. In response to the DATs received, the TCP communication protocol 10 acknowledges by sending ACKs using the ACK transmission path 28 using the ACK generation module 16.

Besides having the PROBE transmission and return paths 22, 24, the Round Trip Time Estimation module 12 also includes an input to the PPA Computation module 18. The Round Trip Time Estimation module 12 provides round trip time information to the PPA Computation module 18. In addition to the input from the Round Trip Time Estimation module 12, the PPA Computation module 18 also receives input from the Congestion Detection module 20 and the Packet Counting module 14. The Congestion Detection module 20 provides congestion event information to the PPA Computation module 18, and the Packet Counting module 14 provides DAT arrival event information to the PPA Computation module 18.

The Packet Counting module 14 also shares the DAT arrival event information with the Congestion Detection module 20 and the ACK generation module 16.

The PPA Computation module 18 provides, as input, PPA information to the ACK generation module 16.

To address the problem in relation to the frequency with which ACKs are generated, the embodiments of the invention estimate the sender's computer congestion window size. Therein also lies a significant distinction from conventional approaches to the congestion problem associated with asymmetric networks and the use of the TCP communication protocol. FIG. 3 is a timing diagram illustrating the timing and sequence of the transmission of DATs and ACKs between the sender and receiver's computers (hereinafter known as sender and receiver). With reference to FIG. 3, the sender 2 congestion window size estimation process is described. The sender 2 transmits DATs with sequence numbers. Similarly, the receiver 6 also transmits ACKs with sequence numbers corresponding to and in response to the DATs received by the receiver 6. While the sender 2 congestion window size estimation process is described, it should be noted that this process is described in the context of a simplex communication. That is, the sender 2 is the only party that is sending information and the receiver 6 is the sole recipient of that information. No interaction is required of the receiver 6 other than to acknowledge the reception of information. Those skilled in the art, however, can easily extrapolate the process into a process for a duplex communication using the information provided herein.

As the sender 2 transmits DATs into the asymmetric network, the DATs arrive at the receiver 6 after a time lag. This time lag is indicated in FIG. 3 as the vertical displacement in the time-axis of the timing diagram between the point when each DAT is transmitted from the sender 2 and the point when each DAT arrives at the receiver 6. That is, the vertical displacement between the tail and head of each arrow shown in FIG. 3, where each arrow conceptually represents the path taken by each DAT (or ACK or PROBE), is this time lag. For purposes of describing the congestion window size estimation process, the sender 2 congestion window size is arbitrarily set to four at the start of the timing diagram in FIG. 3. This means that the sender 2 can transmit four DATs to the receiver 6 without waiting for an acknowledgement from the receiver 6. Meanwhile, using an arbitrary sequence, the receiver 6 also sends a PROBE into the asymmetric network for the purpose of estimating the sender 2 congestion window size. The PROBE arrives at the sender 2 after the sender 2 transmits DAT No. 4. The sender 2 processes the PROBE, and transmits the PROBE into the asymmetric network again for sending the PROBE back to the receiver. After the receiver 6 receives DAT No. 4, the receiver 6 receives the PROBE. The vertical displacement between the tail of the arrow representing the transmission path of the PROBE from the receiver 6 to the sender 2 and the head of the arrow representing the transmission path of the PROBE from the sender 2 to the receiver 6 is the round trip time. This round trip time is only an estimate since there are many extrinsic factors other than those related to the network that can influence the round trip time. For example, during the period that the sender 2 processes the PROBE before transmitting the PROBE into the asymmetric network again, the sender 2 may engage in other processing work and thus delay the period unnecessarily.

In any event, the aim herein is to estimate and not to precisely measure the round trip time. This is because it is not crucial to have the exact sender congestion Window size; a good estimation is sufficient. Within this estimated round trip period, the number of DATs arriving at the receiver 6, assuming that not a single DAT is lost in the network, are counted. Since four DATs were transmitted by the sender 2, the same four DATs are counted by the receiver 6. Consequently, the estimated congestion window size is determined to be four.

While the receiver 6 is estimating the congestion window size, the receiver 6 also acknowledges those DATs that have arrived. This ensures that the sender 2 is informed that the receiver 6 has received the earlier transmitted DATs so that the sender continues with the transmission of DATs. The receiver 6 acknowledges the DATs according to a predetermined value known as the PPA (described briefly in the foregoing). Again, the PPA in this particular sequence is arbitrarily set to two at the start of the timing diagram. This means that for every two DATs received by the receiver 6, the receiver 6 acknowledges with one ACK.

At this juncture, another value that must be noted is the preset value of the minimum number of ACKs that the receiver 6 must transmit within each sender 2 congestion window. The relationship between the PPA and the preset value of the minimum number of ACKs is as follows:

$$PPA = \text{estimated sender congestion window size/preset value}$$

where the PPA can be found by using the estimated sender congestion window size and the preset value.

Subsequently, the PPA is controlled according to the following relationship that involves predetermined values known as max_PPA and min_PPA.

$$PPA = \min(\text{max\_PPA}, \text{floor(estimated window size/preset value)}) \quad PPA = \max(\text{min\_PPA}, PPA)$$

The max_PPA is the upper limit for the PPA and the min_PPA is the lower limit for the PPA. In the event that the sender 2 congestion window size is large, the PPA is consequently, according to the computation using the first equation, also large. Such a large PPA causes the receiver 6 to transmit ACKs only upon receiving a correspondingly large number of DATs. When the sender 2 receives the ACKs in such circumstances, the sender 2 is not precluded from transmitting bursts of DATs. The effect of these bursty DAT transmissions can result in network congestion. Hence with the max_PPA, the PPA is limited and thereby bursts of DAT transmission from the sender 2 can be avoided. By varying the max_PPA according to the most recent congestion situation in the network that is detected by the receiver 6, a better control mechanism for controlling the burstiness of DAT transmission is provided.

For example, if the sender 2 congestion window size is 12 and the preset value of the minimum number of ACKs is 3, the quotient of the division of the two values according to the first equation, and therefore the resulting PPA, is 4. This means that the receiver 6 is tasked to wait for the arrival of four DATs before acknowledging with an ACK. However, subject to the congestion situation of the network, this may not be the case. According to the second equation, the minimum value of a comparison between the max_PPA and the floor function, i.e. the lower integer, of the above quotient is assigned to the PPA. Subsequently, the PPA is further compared with the min_PPA and the maximum value of the comparison is assigned to the PPA. Therefore, by implementing the control mechanism, it is ensured that the higher value of the min_PPA and lower value of the max_PPA and the floor function of the above quotient is assigned to the prevailing PPA. The detailed description for the operation of the control mechanism using the min_PPA and max_PPA is provided hereinbelow.

Since the PPA is arbitrarily set to two at this point, upon receiving DAT No. 2 the receiver 6 acknowledges with an ACK. This ACK is accorded the sequence number 2 so that the sequence number corresponds with DAT No. 2. ACK No. 2 takes time to reach the sender 2 and while ACK No. 2 is in the asymmetric network being transmitted to the sender 2, DAT No. 4 reaches the receiver 6. In response to DAT No. 4, the receiver 6 acknowledges with another ACK, this time, ACK No. 4.

Upon receiving ACK No. 2, the sender 2 increases the congestion window size to 5. The sender 2 responds by transmitting DATs No. 5, No. 6, and No. 7 to the receiver 6. Before the sender 2 sends DATs No. 8 and No. 9, the sender 2 receives ACK No. 4. In response to this, the sender 2 congestion window size further increases to 6. On the part of the sender 2, there remains three more DATs to be transmitted to the receiver 6, since the congestion window size at this point is 6 and three DATs have already been transmitted. Subsequently, the DATs No 8, No. 9 and No. 10 are transmitted to the receiver 6.

Using the previously measured round trip time, the receiver 6 upon receiving DAT No. 5 starts to count the number of subsequent DATs that are received within the period defined by the measured round trip time. The receiver 6 therefore counts DATs No. 6, No. 7, No. 8, No. 9, and No. 10. Since the window defined by the measured round trip time has not expired when the receiver 6 counts DAT No. 10, the count continues until the window expires.

As the PPA remains at two and the last acknowledgement by the receiver 6 is in response to the arrival of DAT No. 4, the receiver 6 transmits ACKs No. 6, No. 8 and No. 10. When ACK No. 6 reaches the sender 2, the congestion window size is increased to 7. The sender 2 responds to ACK No. 6 by following with transmission of DATs No. 11, No. 12 and No. 13. DATs No. 11 and No. 12 subsequently arrive at the receiver 6 before the window defined by the Measure Round Trip Time expires. The DAT count by the receiver 6 therefore increases to seven as the window expires. Hence, the estimated sender 2 congestion window size is determined to be 7 at this point.

As can be understood from the foregoing, the receiver 6 accurately estimates the congestion window size even though a time lag exists between the true state of the congestion window size and estimated congestion window size.

The measurement of the round trip time is described in detail with reference to FIG. 4. FIG. 4 includes FIG. 4A and FIG. 4B. The processes shown in these figures are ascribed to the Round Trip Time Estimation module 12 of FIG. 2. In the example hereinabove, the preset value of the minimum number of ACKs is 3. In practice, this value should not be too small as the preset value is a reflection of the number of ACKs transmittable in each window full of DATs received by the receiver 6. If all the ACKs acknowledging a window full of DATs are lost, the sender 2 performs a timeout.

In FIG. 4A, a simple process for determining the commencement of a process to measure the round trip time is illustrated. This process includes two steps:

a Wait for Period M step 402 and a Measure Round Trip Time step 404. The Wait for Period M step 402 can be, for example, a simple timer that loops until a period M is up and advances the Round Trip Time Estimation module 12 to the Measure Round Trip Time step 404. In the Measure Round Trip Time step 404, a process related to the measurement of the round trip time is carried out.

A number of round trip measurements may overlap at any instance. FIG. 4B is a more detailed diagram of step 404. When this process is initiated, the Round Trip Time Estimation module 12 performs a test condition/make decision in decision block 406 in relation to the implementation of the transmission of PROBEs. Decision blocks 406 checks if the implementation allow for using sent round trip. If the condition is tested true, the Round Trip Time Estimation module 12 performs another test condition/make decision step 408. A check is made to determine if data was sent recently If the condition is tested false, the Round Trip Time Estimation module 12 performs yet another test condition/make decision in decision block 410. The decision block 408 relates to the transmission of data packets by the receiver 6 and the step 410 relates to the activation of a TCP time option.

If the condition is tested true in step 408, the Round Trip Time Estimation module 12 performs a Measure Round Trip Time Using Data Packet step 412.

In this step, the receiver 6 measures the round trip time by tracking the round trip time that starts when the receiver 6 transmits data packets to the sender 2 and ends when the sender 2 responds to these data packets. Hence, these data packets and the corresponding response from the sender 2 collectively form one type of PROBEs. If the condition is tested false in step 408, the round trip time module 12 performs the test condition/make decision in decision block 410. In decision block 410, the Round Trip Time Estimation module 12 checks if the TCP time option is activated. If activated, the TCP time option enables the Round Trip Time Estimation module 12 to piggyback a timestamp on an ACK transmitted by the receiver 6 to the sender 2 in step 414.

On the other hand, if the TCP time option is not activated, the Round Trip Time Estimation module 12 transmits an Internet Control Message Protocol (ICMP) echo, a timestamp packet or a packet with an invalid port in order to solicit a reply from the sender 2 in a step 418 and waits for this reply in a step 420. The Round Trip Time Estimation module 12 measures the time interval between the transmission of the ICMP echo, the timestamp packet or the packet with an invalid port and the corresponding reply, and designates this as the round trip time. The ICMP echo, the timestamp packet or the packet with an invalid port forms another type of PROBE.

Based on the measured round trip time, the receiver 6 counts the number of DATs that arrive within such a period. This count as mentioned in the foregoing provides a good indication of the sender 2 congestion window size. It is not crucial to have the exact sender 2 congestion window size. Only a good estimation of the sender 2 congestion window size is required.

FIG. 5 illustrates the process by which the receiver 6 counts the number of DATs that arrive using the Packet Counting module 14. This process begins when the Packet Counting module 14 performs a test condition/make decision in decision block 502, where a check is made on whether the duplicate of the DAT has arrived. If the DAT is a duplicate of a previously received DAT, the condition is tested true and the Packet Counting module 14 proceeds to perform another test condition/make decision in decision block 504. The decision block 504 relates to the determination of the time that has lapsed between the arrivals of the duplicate DATs with reference to a factored round trip time. This factored round trip time (S times the measured round trip time) is the amount of time that the sender 2 waits for an acknowledgement before re-transmitting the DATs in the slow start stage. Empirically, S may be chosen from the range between 1.5 and 3, i.e., the factored round trip time may be between 1.5 and 3 times the measured round trip time. Alternatively, the factored round trip time may be assigned the averaged measured round trip time value+4 times the standard deviation of the measured round trip time. The averaged measured round trip time value and the standard deviation of the measured round trip time can be gleaned from the Round Trip Time Estimation module 12. If the time that has lapsed between the arrivals of the duplicate DATs is greater than the factored round trip time, the Packet Counting module 14 proceeds to a Generate Duplicate Event step 505. Otherwise, the Packet Counting module 14 passes control to the ACK Generation module 16 (indicated by connection symbol 66). The Packet Counting module 14 subsequently passes control and provides input to a Packet Miss Recovery module 20a (indicated by connection symbol 51) and a Minimum PPA Computation module 18a (indicated by connection symbol 55), respectively. The Packet Miss Recovery module 20a is a subset of the Congestion Detection module 20. The input that is provided to the Minimum PPA Computation module 18a is a Duplicate Event 55 condition. Having the Generate Duplicate Event step 505 provides the receiver 6 with a means to determine if the duplicate DAT is a retransmission from the sender 2. This is the case if the duplicate DAT arrives after the factored round trip time.

In decision block 502, of the DAT is not a duplicate of the previously received DAT, the condition is tested false and the Packet Counting module 14 performs a further test condition/make decision in decision block 506. The step 506 relates to the detection of a missing DAT that has a fast-retransmit flag set. If there is no missing DAT with the fast-retransmit flag set, the condition is tested false and the Packet Counting module 14 passes control to the Congestion Detection module 20 (indicated by connection symbol 54). Otherwise, the Packet Counting module 14 advances to yet another test condition/make decision in decision block 508. In decision block 508, the Packet Counting module 14 checks if the material time is still within the counting period that is described in relation to step 402. If the condition in decision block 508 is tested true, the Packet Counting module 14 proceeds to perform an Increment Current Packet Counting step 510. In this step, the Packet Counting module 14 increases the current packet count by one, after which the Packet Counting module 14 passes control to the Congestion Detection module 20.

If the condition in decision block 508 is tested false, the Packet Counting module 14 proceeds to perform another test condition/make decision in decision block 512. The condition tested in step 512 is in relation to the packet count value. If the packet count value is greater than half a preset value (old_packet_count), the Packet Counting module 14 provides input to a Maximum PPA Computation module 18*b* in a Pass to Maximum PPA Computation module 18*b* step 514. The input that is provided to the Maximum PPA Computation module 18*b* is a Smooth Round Trip Event condition (indicated by connection symbol 52). Processing otherwise the continuance of step 516, if decision block 512 returns false, the Packet Counting module 14 provides input to a PPA Computation module 18 in a Pass to PPA Computation module 18 step 516. The input that is provided to the PPA Computation module 18 is the packet count. In the event that the condition is tested true in the test condition/make decision step 512 and having performed the Pass to Maximum PPA Computation module 18*b* step 514, the Packet Counting module 14 also proceeds to perform the Pass to PPA Computation module 18 step 516. Subsequently, the Packet Counting module 14 restarts counting in a Restart Counting step 518. In this step, the start time is traced back retrospectively. After the packet count is restarted, the Packet Counting module 14 proceeds to perform the Increment Current Packet Counting step 510.

As a general rule, the sender 2 congestion window size reduces when there is a time out after a wait for acknowledgement from the receiver 6 or when the sender 2 performs fast retransmission. The basis for this rule is that the sender 2 transmits less DATs to the asymmetric network if the sender 2 detects that there is congestion. However, if the receiver 6 is unaware of these events and continues to transmit ACKs according to the PPA, the sender 2, as a result, undergoes a prolonged wait when the sender 2 performs retransmission of DATs. This is undesirable, as the purpose of the retransmission of DATs into the asymmetric network is to ensure that communications is re-established without further delay. Furthermore, the consequence of reducing the PPA is that the receiver 6 transmits ACKs more frequently, thereby accelerating the increase of the sender 2 congestion window size. Hence, the receiver 6 observes DAT arrival patterns and detects potential congestion scenarios, for example, when DATs arrive out of sequential order.

When the receiver 6 observes such events, the receiver 6 reduces the PPA to one. In addition, the receiver 6 also sets the estimated sender 2 congestion window size (old_packet_count as mentioned above) to one. In order to observe the DAT arrival pattern, the receiver 6 must first count the number of incoming DATs. From there, a check is made as to whether any DAT is missing, and whether three duplicated DATs have been received. If this is so, the sender 2 may perform fast-transmission and reduce the sender 2 congestion window size by half. In addition, there may be times when the sender 2 does not have any information to send to receiver 6. When this happens, the TCP communication protocol dictates that if the sender 2 had been idle for a specified period, the sender 2 must reduce the sender 2 congestion window size to one. The logic for this is that the network congestion situation may have changed when sender 2 had been idle. Hence, by reducing the sender 2 congestion window size to one, it is ensured that the sender 2 does not overwhelm the asymmetric network with DATs and cause or contribute to the congestion situation. In general, this principle is applicable to other types of network as well.

The activities in relation to the process carried out by the Congestion Detection module 20 are represented by a flow diagram shown in FIG. 6. When the Packet Counting module 14 passes control to the Congestion Detection module 20, the Congestion Detection module 20 performs a test condition/make decision in step 602. In this step, the Congestion Detection module 20 checks if the DAT that arrived creates a new missing DAT in the sequence of DATs previously received. An example of such a scenario is when the DAT that arrived has a larger sequence number than what the receiver 2 expects, thereby indicating that a DAT in the middle of the sequence of DATs received by the receiver 6 is lost in the network. If the condition is tested true, a record on the new missing DAT is created in a Create Record' step 604. Processing continue at decision block 606. Otherwise, the Congestion Detection module 20 proceeds to another test condition/make decision in step 606. In this step, the Congestion Detection module 20 checks if there is any DAT missing from the sequence of DATs previous received. If the condition is tested true, the Congestion Detection module 20 proceeds to yet another test condition/make decision in step 608. Otherwise if decision block 606 returns false, the Congestion Detection module 20 proceeds to a test condition/make decision in step 610 where a check is performed on the amount of time that have lapsed since the DAT that arrived. This lapsed time is checked against a preset value I, where I is a multiplication factor in relation to the amount of time that the receiver 6 expects the sender 2 to wait or idle before reducing the sender 2 congestion window size to one. Empirically, I is set between 1.5 and 3. If a time equivalent to I times the measured round trip time has lapsed since the DAT that arrived, the Congestion Detection module 20 proceeds to a Raise long_packet_interval Event step 612. Otherwise, the receiver 6 stores the DAT that arrived. In this step, the Congestion Detection module 20 provides input to the PPA Computation module 18 following which, the Congestion Detection module 20 proceeds to a Restart Counting step 614. The input that is provided to the PPA Computation module 18 is a long_packet_interval Event 61. After performing the Restart Counting step 614, the Congestion Detection module 20 passes control to the ACK Generation module 16 (indicated by connection symbol 66).

In the event that the condition in decision block 606 is tested true, the Congestion Detection module 20 performs the step 608 where the Congestion Detection module 20 checks if the DAT that arrived is the third DAT that is received in relation to other missing DATs not including the miss that the DAT has caused, if this is a missing DAT. The count starts when there is discovery that a DAT is missing from the sequence. Each DAT that arrives at the receiver 6 subsequent to the discovery is counted. If the condition is tested true, the Congestion Detection module advances to a Set Flag and Generate Event step 616. In this step, a fast-retransmit flag is set and a Congestion Event 62 is generated and passed as input to the Maximum PPA Computation module 18*b*. A fast re-transmit flag can be generated on top of a congestion recovering flag. Subsequent to this, the Congestion Detection module 20 proceeds to a test condition/make decision step 618. If the condition in the step 606 is false, the Congestion Detection module 20 bypasses the step 616 and proceeds to the step 618. In decision block 618, the Congestion Detection module checks if the DAT that arrived is a missing DAT. If the condition is tested true, the Congestion Detection module passes control to the Packet Miss Recovery module 20*a* where the processes which the Packet Miss Recovery module 20*a* perform are represented in FIG. 7. If the condition is tested false, the Congestion Detection module 20 passes control to the ACK Generation module 16 (indicated by connection symbol 66).

If the receiver 6 observes that the sender 2 is performing fast retransmission or has re-entered the slow start stage, the receiver 6 stops counting DATs until all these events recover. The recovery from such events is detectable by the appearance of missing DATs. Recovery from a slow start stage usually occurs after a period of two or more times the round trip time after the initial miss has occurred. The time required for recovery from a fast retransmission is usually shorter than that. In the first instance, the PPA is changed to min_PPA, and the old_packet_count value is changed to zero. In the second instance, the PPA is reduced by half and the old_packet_count value is also changed to zero. The TCP communication protocol resumes packet counting after all these events leading to fast retransmission have recovered. By setting the old_packet_count to 0, the new packet count is instantly adopted.

Referring to FIG. 7, the Packet Miss Recovery module 20a, upon gaining control from the Packet Counting module 14 in relation to the Generate Duplicate Event step 505, performs a Generate Recover from Slow Start Event step 702. In this step, the Packet Miss Recovery module 20a in turn provides input to the PPA Computation module 18 in relation to a situation when the receiver 6 expects the sender 2 to re-enter the slow start stage and change the sender 2 congestion window size to one. The input that is provided to the PPA Computation module 18 is a Recover from Slow Start Event 71. After passing input to the PPA Computation module 18, the Packet Miss Recovery module 20a proceeds to perform a Restart Counting Period step 704 where the counting period is restarted.

In addition to the above, the Packet Miss Recovery module 20a, after gaining control from the Congestion Detection module, also performs a test condition/make decision in step 706. In this step, the Packet Miss Recovery module 20a checks if the lapse in time since the miss occurred is greater than the factored round trip time (S times the measured round trip time or the averaged measured round trip time value+4 times the standard deviation of the measure round trip time as described hereinbefore). If the condition is tested true, the Packet Miss Recovery module 20a advances to a Generate Congestion Event step 708 where the Packet Miss Recovery module 20a generates a Congestion Event 62 if the DAT missing condition has occurred and a Congestion Event 62 had not been generated previously for this condition. If the condition is tested true in the step 706, the Packet Miss Recovery module 20a provides input 62 to the Maximum PPA Computation module 18b. The input that is provided to the Maximum PPA Computation module 18b is a Congestion Event 62. Subsequently, the Packet Miss Recovery module 20a proceeds to a Cancel Missing Packet Record step 710 where the Packet Miss Recovery module 20a cancels the record for the missing DAT. After which the Packet Miss Recovery module 20a proceeds to yet another Generate Recover from Slow Start Event step 712. In this step, the Packet Miss Recovery module 20a provides input to the PPA Computation module 18. The input that is provided to the PPA Computation module 18 is the Recover from Slow Start Event 71. Subsequently, the Packet Miss Recovery module 20a proceeds to a test condition/make decision in step 714.

If the condition is tested false in the step 706, the Packet Miss Recovery module 20a proceeds to yet another test condition/make decision in step 716. In this step, the Packet Miss Recovery module 20a tests for a condition in relation to the fast-retransmit flag. A check is made to determine if the fast-retransmit flag is set for this DAT missing condition. If step 716 returns false, the Packet Miss Recovery module 20a proceeds to another Cancel Missing Packet Record step 718 where the outcome is similar to that of the Cancel Missing Packet Record step 710. Thereafter, the Packet Miss Recovery Module 20a passes control to the ACK Generation module 16 (indicated by connection symbol 66). Otherwise, if step 716 returns true, the Packet Miss Recovery module 20a proceeds to another Cancel Missing Packet Record step 720, where the outcome is similar to that of the Cancel Missing Packet Record step 710. The repetition occurs because the record for the missing DAT cannot be canceled until step 716 is processed.

After having performed the Cancel Missing Packet Record step 720, the Packet Miss Recovery module 20a proceeds to a Generate Recover from Fast-Retransmit Event step 722, where the Packet Miss Recovery module 20a provides input 73 to the PPA Computation module 18. This input is in relation to the event when the receiver 6 receives a missing DAT where three duplicated ACKs had been transmitted after the DAT missing condition occurred. With this input, the Packet Miss Recovery module 20a provides the PPA Computation module 18 with information regarding the reduction of the PPA by half. This input is a Recover from Fast-Retransmission Event 73. Consequently, the Packet Miss Recovery module 20a performs the step 714 where the condition in relation to other missing DAT and the fast-retransmit flag is tested. If there is no other packet miss with the fast-retransmit flag set, the Packet Miss Recovery module 20a proceeds to a Restart Counting step 724 where the counting period is restarted and subsequently control is passed to the ACK Generation module 16 (indicated by connection symbol 66). Otherwise, the Packet Miss Recovery module 20a passes control to the ACK Generation module 16 (indicated by connection symbol 66) if the condition in the step 714 is tested true.

As illustrated in FIG. 1 and described in the preceding sections, the PPA Computation module 18 receives input from the Round Trip Time Estimation module 12, the Packet Counting module 14, the Congestion Detection module 20, and the Packet Miss Recovery module 20a. The PPA Computation module 18 in essence manages the value of PPA. The PPA Computation module 18 receives information such as packet count from the Packet Counting module 14. The PPA Computation module 18 uses this information to estimate the sender 2 congestion window size, in conjunction with the information received from the Round Trip Time Estimation module 12.

Under normal circumstances, the sender 2 congestion window size can either remain constant or increase. However, as indicated in the preceding sections, the measured round trip time is only an approximation. Therefore, the measured round trip time may fluctuate. Hence, the number of DATs counted within each window defined by each measured round trip time may also fluctuate. In consideration of this, the solution provided by the preferred embodiment of the invention maintains the packet count at an old value if a new value is smaller. That is to say, a preceding packet count that is larger takes precedence over the current packet count which is smaller. However, there are exceptions. One example of an exception is when the receiver 6 expects the sender 2 to re-enter the slow start stage, or perform fast retransmission, or re-adjust after a long idle. In this example, the old packet count value is set to 0 so that the packet count value can be measured again by restarting the packet count process. If the packet count for each measured round trip time decreases, the receiver 6 is slow to detect because of the measurement methodology. Fundamentally, the preferred embodiment of the invention measures the packet count at the end of the receiver 6. This delay is therefore inevitable taking into account that DATs travel through the asymmetric network that may cover a wide geographical area. However, because of the persistence mechanism provided in the solution according to the preferred embodiment of the invention, the decrease in the packet count is measurable.

FIG. 8 illustrates the processes that the PPA Computation module 18 carries out. In one such process, the PPA Computation module 18 receives input, ie the long_packet_internal Event 61 and the Recover from Slow Start Event 71, from the Congestion Detection module 20 and the Packet Miss Recovery module 20a, respectively. Having received this input, the PPA Computation module 18 performs a Set PPA to min_PPA step 802. In this step, the PPA Computation module 18 resets the old_packet_count to 0.

In another process, the PPA Computation module 18 receives input, ie the Recover from Fast-Retransmission Event 73, from the Packet Miss Recovery module 20a and performs a Set PPA to max_PPA step 803. Similarly in this step, the PPA Computation module 18 sets the old_packet_count to 0.

In the third process that the PPA Computation module 18 carries out, the PPA Computation 18 receives input, i.e. the packet count 53, from the Packet Counting module 14. Having received this input from the Packet Counting module 14, the PPA Computation module 18 performs a test condition/make decision in step 804. The condition that is tested in this step is in relation to the packet count. Here, the PPA Computation module 18 checks if the packet count is greater than or equal to the old_packet_count. If the condition is tested true, the PPA Computation module 18 advances to a Record Packet Count step 806. In this step, the PPA Computation module 18 records the packet count as the old_packet_count. If the condition is tested false in the step 804, the PPA Computation module 18 proceeds to perform another test condition/make decision in step 808. The condition tested in this step is also in relation to the packet count. Here, the PPA Computation module 18 checks if the packet count is less than the old_packet_count for C consecutive round trip periods. C is a parameter for determining the sensitivity of the receiver 6 to the shrinkage of data rate and is set to 2 or 3. If the condition is tested true, the PPA Computation module 18 advances to a Use New Packet Count step 810. In this step, the PPA Computation module 18 adopts the new packet count. Otherwise, if step 808 returns false, the PPA Computation module 18 advances to a Use old_packet_count step 812 where the PPA Computation module 18 adopts the old_packet_count as the packet count. Having performed either step 810 or 812, the PPA Computation module, 18 proceeds to perform the Record packet count step 806 where the packet count is recorded.

Having performed the step 806, the PPA Computation module 18 advances to another test condition/make decision in step 814. In this step, the PPA Computation module 18 tests for the condition in relation to the packet count. The PPA Computation module 18 checks if the packet count is greater than the minimum number of ACKs per measured round trip time. If the condition is tested false, the PPA Computation module 18 further advances to a Set PPA to min_PPA step 816 where the PPA Computation module 18 sets the PPA to min_PPA. Otherwise, if decision block 814 returns false, the PPA Computation module 18 proceeds to perform a Compute PPA step 818. In this step, the PPA Computation module 18 computes the PPA as a function of the packet count and the minimum number of ACKs per measured round trip, in accordance with an equation shown in the preceding sections. Having computed the PPA, the PPA Computation module 18 advances to a test condition/ make decision in step 820. In this step, the PPA Computation module 18 checks if the computed PPA is larger than the max_PPA. If the condition is tested true, the PPA Computation module 18 sets the PPA to max_PPA in step 822. Otherwise, if decision block 820 returns false, the PPA Computation module 18 sets the PPA to the computed value in step 824.

As mentioned hereinbefore, the advantage of sending ACKs according to the PPA is that when the sender 2 receives ACKs from the receiver 6, the sender 2 faces a "sudden" increase in the number of DATs allowed for transmission. This increase is "sudden" because the increase in the sender 2 congestion window size is exacerbated by the fact that the sender 2 has transmitted all the DATs that were allowed for transmission according to the last sender 2 congestion window size. If the sender 2 strictly adheres to the sender 2 congestion window size and transmits the number of DATs according to that sender 2 congestion window size, a burst of DATs appear in the asymmetric network. If the asymmetric network is near congestion, there could be instances where DATs are lost in the asymmetric network. The solution provided by this embodiment of the present invention addresses this by reducing the ACKs that the receiver 6 transmits according to the PPA. This is done through the reduction of the value of the max_PPA and where upon the observation of the congestion. The receiver 6 slowly increases the max_PPA if the receiver 6 does not observe congestion after a while. As already mentioned, the max_PPA is an upper limit of the PPA, and the min_PPA is the lower limit of the PPA. Both values may change according to the network condition as observed by the receiver 6. If congestion occurs in the network, the max_PPA is reduced so as to reduce the PPA. Consequently, the burst of the DATs from the sender 2 is decreased. The max_PPA is subsequently reverted back to the original value when a smooth flow of DATs is observed in the asymmetric network.

Reference is made to FIG. 9 to describe the process of the Maximum PPA Computation module 18b. The Maximum PPA Computation module 18b is a subset of the PPA Computation module 18. As such, the Maximum PPA Computation module 18b also receives input from the Packet Counting module 14 and the Congestion Detection module 20. In a first process, the Maximum PPA Computation module 18b receives input, i.e., the Smooth Round Trip Event 52, from the Packet Counting module 14. Upon receiving the input 52 from the Packet Counting module 14, the Maximum PPA Computation module 18b performs an Increment smooth_round_trip count step 902. In this step, the Maximum PPA Computation module 18b increases an attribute known as the smooth_round trip_count. This attribute is tested as the Maximum PPA Computation module 18b advances to a test condition/make decision in step 904. In this step, the Maximum PPA Computation module 18b tests and compares the smooth_round_trip_count attribute with a parameter known as SR. In step 904, the Maximum PPA Computation module 18b checks if the smooth_round_trip_count is greater than the SR parameter. The SR parameter is preset and is attributed to the number of round trips where transmission was smooth or there was no congestion before the receiver 6 considers increasing the max_PPA value. Empirically, the SR parameter is set at 8. If the condition in the step 904 is tested true, the Maximum PPA Computation module 18b advances to another test condition/make decision step 906.

In this step, the Maximum PPA Computation module 18b tests for the condition in relation to the max_PPA. If the max_PPA is lesser than an original max_PPA value, the condition is tested true. This original max_PPA value is preset and is used as the initial value for the max_PPA. If the condition is tested true, the Maximum PPA Computation module 18b proceeds to perform set Increment max_PPA step 908. Here the Maximum PPA Computation module 18b increases the max_PPA by 1.

In another process that the Maximum PPA Computation module 18b carries out, the Maximum PPA Computation module 18b receives input, ie the Congestion Event 62, from the Congestion Detection Module 20. With this input, the Maximum PPA Computation module 18b performs a Record Time step 910. In this step, the Maximum PPA Computation module 18b records the event and the time when the Congestion Event 62 occurs. Having recorded the event and time, the Maximum PPA Computation module 18b advances to a Clear smooth_round_trip_count step 912. Subsequently, the Maximum PPA Computation module 18b proceeds to perform a test condition/make decision in step 914. In this step, the Maximum PPA Computation module 18b tests for the condition in relation to the number N of occurrences of Congestion Events 62 within a specific time. This specific time is determined by T times the measured round trip time and is empirically set to 2 to 6. The test for number of occurrence of the Congestion Event 62 is attributed to a specific parameter known as N where N is empirically set to 1 or 2.

In the step 914, the Maximum PPA Computation module 18b checks if the Congestion Event 62 is the $N^{th}$ occurrence within the specific time. If the condition is tested true, the Maximum PPA Computation module 18b proceeds to perform a Reduce max PPA step 916. In this step, the Maximum PPA Computation module 18b reduces the max_PPA by a factor of F. F is the factor that the max_PPA shrinks by is empirically set to 0.5. However, the PPA is maintained at least greater or equal to the min_PPA.

The ACK Generation module 16 shown in FIG. 1 controls the generation of ACKs. The process that goes on within the ACK acknowledgement 16 is illustrated in FIG. 11. The ACK Generation module generates and holds ACKs in accordance with the PPA determination of the number of DATs arriving or until the Acknowledgement Timeout (ATO) occurs. The ATO is the maximum amount of time that a receiver holds an acknowledgement, after which the acknowledgement is sent. The value of ATO in this instance is set to 500 milliseconds. In addition, if the receiver 6 receives a DAT that is not expected to arrive, the receiver 6 generates an ACK without delay in this instance.

As shown in FIG. 11 and described hereinabove, the ACK Generation module 16 gains control from the Packet Counting module 14, the Congestion Detection module 20 or the Packet Miss Recovery module 20 (indicated by connection symbol 66). With this control, the ACK Generation module 16 performs a test condition/make decision in step 110. In this step, the ACK Generation 16 tests for the condition in relation to the sequence number of the DAT that has arrived. The ACK Generation module 16 checks if the DAT sequence is correct. If the condition is tested false, the ACK Generation module 16 proceeds to perform a Send ACK step 111. In this step, the ACK Generation module 16 sends an ACK with the expected sequence number to the sender 2. Having done so, the ACK Generation module 16 advances to perform a Set Unacknowledged Packet step 112. In this step, the ACK Generation module 16 sets a parameter defined to represent the number of unacknowledged packets to zero. This consequently affects the ATO because there is no longer any holdup in relation to the ATO.

If the condition in the step 110 is tested true, the ACK Generation module 16 proceeds to perform yet another test condition/make decision in step 113. The condition tested in the step 113 is in relation to the status of the DAT that has arrived. In this step, the ACK Generation 16 checks if the DAT that has arrived is a missing DAT. If the condition is tested true in this step, the ACK Generation module 16 advances to a Send ACK step 114. Here, the ACK Generation module 16 transmits an ACK with an updated expected sequence number. The expected sequence number in this case is the sequence number of the first missing DAT of a group of missing DATs, to which the missing DAT has arrived, belongs. Under normal circumstances, the expected sequence number is the sequence number of the next DAT that the receiver 6 expects to receive from the sender 2. If the condition is tested false in the step 113, the ACK Generation module 16 proceeds to perform an Increment Parameter step 115. The ACK Generation module 16 in this step increases the parameter representing the number of unacknowledged packet. The ACK Generation module 16 proceeds to check if the parameter representing the number of unacknowledged packet is equal to the PPA in a test condition/make decision in step 116. If the condition is tested true, the ACK Generation module 16 proceeds to perform a Send ACK step 117. In this step, the ACK Generation module 16 transmits an ACK with the updated expected sequence number. If the condition in the step 116 is tested false, the ACK Generation module 16 proceeds to yet another test condition/make decision step 118. In this step, the ACK Generation module 16 tests for the condition in relation to the arriving DATs. Step 118 checks whether to hold the acknowledgement. In the event the ATO expires, the ACK Generation module 16 advances to Send ACK step 119 where the receiver 6 transmits an ACK with the expected sequence number. Otherwise, upon the arrival of a DAT, the ACK Generation module 16 loops back to perform the step 110 and therefore the test prescribed in the step 110.

As, described hereinafter, the min_PPA is the lower limit of the PPA. Under normal circumstances, the min_PPA is empirically set at 2. However, there may be situations when the min_PA is set to 1. The situations that require the min_PPA to be set to 1 are represented by instances where the upstream transmission has a high error rate. For example, in some wireless communication environment, the wireless upstream channel may have a high error rate. In such circumstances, the receiver 6 can conclude from the DATs that are received from the sender 2 that the ACKs are lost if the receiver 6 receives duplicated DATs that are approximately one measured round trip time apart. In such circumstances, there is a need for a Minimum PPA Computation module 18a in a solution provided by the embodiment of the invention. In conjunction with the other modules hereinbefore, the Minimum PPA Computation module 18a forms a second embodiment of the invention. The basic idea involved in implementation of the Minimum PPA Computation module 18a is that the rate of ACK transmission needs to be increased in circumstances described above, i.e. where there is a high error rate. By increasing the rate of ACK transmission, more ACKs reach the sender 2 even though some ACKs are still lost in the transmission. After the high error rate situation has recovered, the Minimum PPA Computation module 18a increases the min_PPA back to the original setting.

Reference is made to FIG. 10 to illustrate the processes that are carried out within the Minimum PPA Computation module 18a. This second embodiment implementation is most appropriate for use on the receiver 2 when used as a wireless terminal. The Minimum PPA Computation module 18a, like the Maximum PPA Computation module 18b, is a subset of the PPA Computation module 18. Therefore, the Minimum PPA Computation module 18a receives input 52 from the Packet Counting module 14. Upon receiving the input from the Packet Counting module 14, the Minimum PPA Computation module 18a carries out the process that begins with Increment min_PPA_smooth_round_trip_count step 101. In this step, the Minimum PPA Computation module 18a increases a preset min_PPA_smooth_round trip count attribute and subsequently checks if this is greater than the preset parameter SR_min in a test condition/make decision in step 102. The SR_min parameter is preset and is attributed to the number of round trips where there is no congestion detected by the receiver 6 before the receiver 6 considers incrementing the min_PPA. Empirically, the SR_min is set at 5. If the condition in the step 102 is tested true, the Minimum PPA Computation module 18a advances to yet another test condition/make decision step 103. In the step 103, the Minimum PPA Computation module 18a checks for the condition if the min_PPA is lesser than the original min_PPA. If the condition is tested true, the Minimum PPA Computation module 18a proceeds to perform Increment min_PPA step 104. In this step, the Minimum PPA Computation module 18a increments the min_PPA by 1.

In another process that the Minimum PPA Computation module 18a carries out, and upon receiving the Duplicate Event 55 from the Packet Counting module 14, the Minimum PPA Computation module 18a performs a Record Time step 105. In this step, the Minimum PPA Computation module 18a records the time when the Duplicate Event occurred. Subsequently, the Minimum PPA Computation module 18a proceeds to perform a Clear min_PPA_smooth_round_trip_count step 106. After clearing the min_PPA_smooth_round_trip_count, the Minimum PPA Computation module 18a proceeds to perform a test condition/make decision step 107. Here, the Minimum PPA Computation module 18a tests for the condition in relation to the occurrences of the Duplicate Events within a specified time. This specified time is defined by a preset parameter T_min times the measured round trip time. The Minimum PPA Computation module 18a checks if the number of Duplicate Event that has occurred within that specified time is equivalent to another preset parameter N_min. N_min is empirically set to 4 and T_min is empirically set to 10. Hence, if the Duplicate Event 55 is the 4th occurrence within the last 10 times measured round trip time, the condition is tested true and the Minimum PPA Computation module 18a advances to a Reduce min_PPA step 108. In this step, the Minimum PPA Computation module 18a reduces the min_PPA by 1, however, keeping the min_PPA greater or equal to 1.

In conjunction with the implementation of the Minimum PPA Computation module 18a in the second embodiment of the invention, a modification is required to be made to the Maximum PPA Computation module 18b. The processes that are carried out in this modified Maximum PPA Computation module 18b are illustrated in FIG. 9A. As illustrated in FIG. 9A, the processes that are carried out in the modified Maximum PPA Computation module 18b includes the processes of the Maximum PPA Computation module 18b in the preferred embodiment. The distinction lies in the addition of an Increase min_PPA step 918. After the modified Maximum PPA Computation module 18b has performed the step 916, the modified Maximum PPA Computation module 18b advances to the step 918. In this step, the modified Maximum PPA Computation module 18b increases the min_PPA to 2 if the min_PPA is 1. This step is required as there may be a need to speed up the buildup of the sender 2 congestion window size by setting the min_PPA to 1. However, if the receiver 6 observes signs of congestion in the asymmetric network, the min PPA should be set to 2. The modified Maximum PPA Computation module 18b operates conjunctively with the Minimum PPA Computation module 18a in the second embodiment of the invention.

Figure 12:
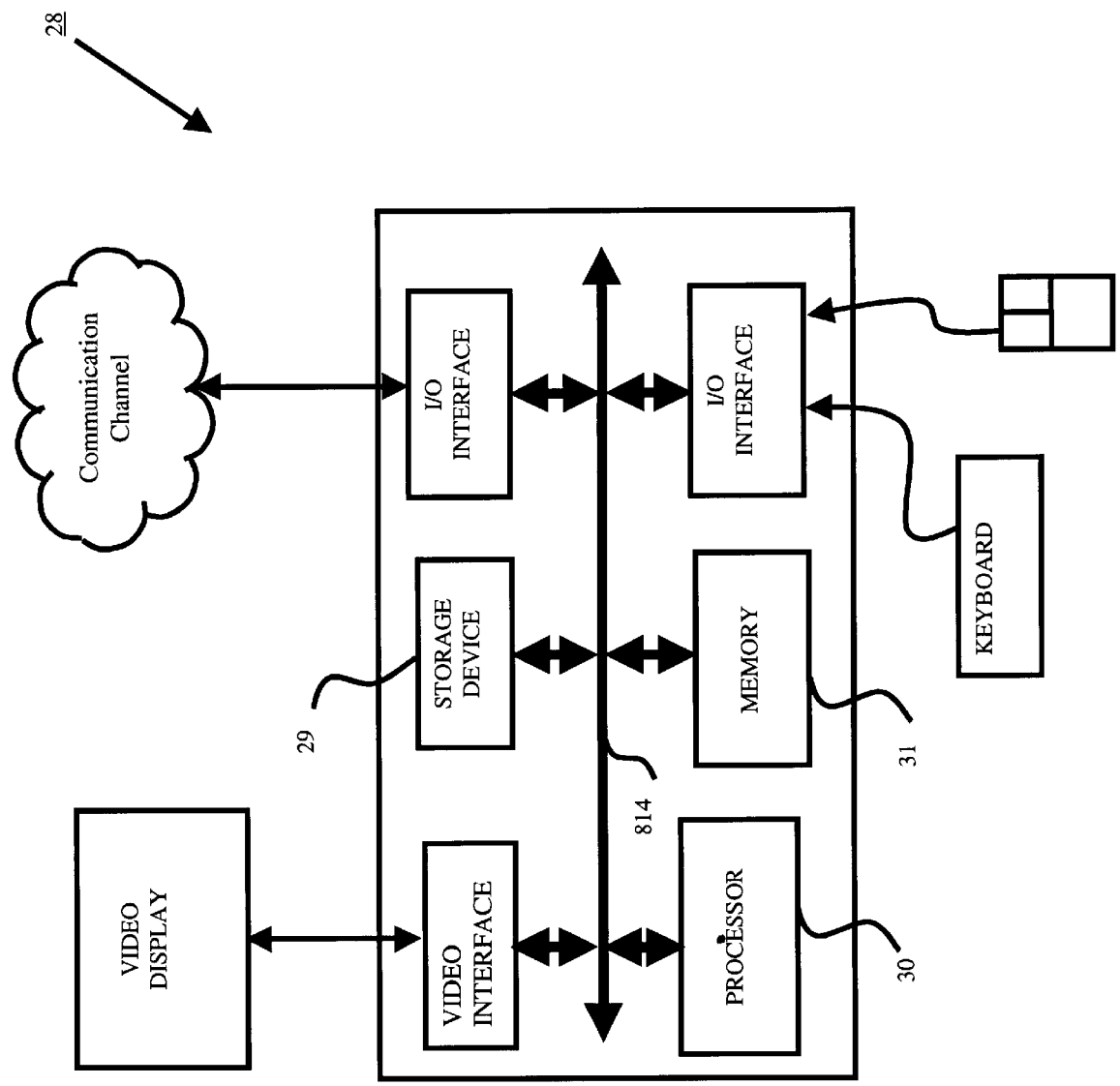
FIG. 12 illustrates a general-purpose computer by which the embodiments of the invention are preferably implemented.

The embodiments of the invention are preferably implemented using a computer, such as the general-purpose computer shown in FIG. 12. In particular, the functionality or processing of the system of FIGS. 1 to 11 can be implemented as software, or a computer program, executing on the computer. The method or process steps for providing a low data transmission rate and intelligible speech communication are effected by instructions in the software that are carried out by the computer. The software may be implemented as one or more modules for implementing the process steps. A module is a part of a computer program that usually performs a particular function or related functions. Also, as described in the foregoing, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects an advantageous apparatus for providing a low data transmission rate and intelligible speech communication in accordance with the embodiments of the invention.

The system 28 is simply provided for illustrative purposes and other configurations can be employed without departing from the scope and spirit of the invention. Computers with which the embodiment can be practiced include IBM-PC/ATs or compatibles, one of the Macintosh (™) family of PCs, Sun Sparcstation (™), a workstation or the like. The foregoing is merely exemplary of the types of computers with which the embodiments of the invention may be practiced. Typically, the processes of the embodiments, described hereinafter, are resident as software or a program recorded on a hard disk drive (generally depicted as block 29 in FIG. 12) as the computer readable medium, and read and controlled using the processor 30. Intermediate storage of the program and any data may be accomplished using the semiconductor memory 31, possibly in concert with the hard disk drive 29.

In some instances, the program may be supplied to the user encoded on a CD-ROM or a floppy disk (both generally depicted by block 29), or alternatively could be read by the user from the network via a modem device connected to the computer, for example. Still further, the software can also be loaded into the computer system 28 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

In the foregoing manner, a method, a system and a computer program product for providing dynamically delayed acknowledgement transmission are disclosed. Only a small number of embodiments are described. However, it will be apparent to one skilled in the art in view of this disclosure that numerous changes and/or modification can be made without departing from the scope and spirit of the invention.

What is claimed is:

1. A method of data communications in an asymmetric network connection according to a communications protocol wherein a receiver transmits acknowledgment packets for acknowledging data packets transmitted by a sender, said method including the steps of:

measuring the interval between the transmission of data from one of said receiver and sender and the reception of a response thereto by said one of said receiver and sender;

determining a window size indicative of the maximum number of said data packets transmittable by said sender for a duration absent any reception of said acknowledgment packets by said sender for said duration in accordance with said communications protocol, wherein said window size is determined using said measured interval; and regulating the frequency of transmission of said acknowledgment packets from said receiver, said regulation dependent on said determined window size; wherein said measuring step includes measuring said interval periodically;

said determining step further includes counting the number of data packets arriving at said receiver for the duration of the last said measured interval and assigning said count to said window size; and counting the number of data packets further includes analyzing the arrival pattern of said data packets wherein said arrival pattern is indicative of the congestion condition of said asymmetric network connection; and further including the step of computing the number of said data packets receivable by said receiver whereupon the transmission of an acknowledgment packet therefor is conditional, wherein said number is represented by a variable known as PPA.

2. The method as in claim 1, wherein said computing step includes computing said PPA using said determined window size and a preset number represented by a variable known as N indicative of the minimum number of acknowledgement packets transmittable by said receiver for the duration of said measured interval.

3. The method as in claim 2, wherein said computing step includes computing said PPA by assigning said PPA the integer value of a value which is directly proportional to said determined window size factorized by the inverse of said N.

4. The method as in claim 3, wherein said regulating step includes transmitting one acknowledgement packet for acknowledging a number of said data packets arriving at said receiver, said number being dependent on said analyzed arrival pattern indicative of said congestion condition and determined by scaling said PPA value.

5. A computer program product for data communications in an asymmetric network connection according to a communications protocol, including:

a computer usable medium having computer readable program code means embodied in said medium for causing data communications wherein a receiver transmits acknowledgments for acknowledging data packets transmitted by a sender, said computer program product having:

computer readable program code means for measuring the interval between the transmission of data from one of said receiver and sender and the reception of a response thereto by said one of said receiver and sender;

computer readable program code means for determining a window size indicative of the maximum number of said data packets transmittable by said sender for a duration absent any reception of said acknowledgment packets by said sender for said duration in accordance with said communications protocol, wherein said window size is determined using said measured interval; and computer readable program code means for regulating the frequency of transmission of said acknowledgment packets from said receiver, said regulation dependent on said determined window size; wherein said computer readable program code means for measuring includes means for measuring said interval periodically;

said computer readable program code means for determining further includes means for counting the number of data packets arriving at said receiver for the duration of the last said measured interval and assigning said count to said window size; and said means for counting further includes means for analyzing the arrival pattern of said data packets wherein said arrival pattern is indicative of the congestion condition of said asymmetric network connection; and further including computer readable program code means for computing the number of said data packets receivable by said receiver whereupon the transmission of an acknowledgment packet therefor is conditional, wherein said number is represented by a variable known as PPA.

6. The computer program product according to claim 5, wherein said computer readable program code means for computing further includes means for computing said PPA using said determined window size and a preset number represented by a variable known as N indicative of the minimum number of acknowledgement packets transmittable by said receiver for the duration of said measured interval.

7. The computer program product according to claim 6, wherein said computer readable program code means for computing includes means for computing said PPA by assigning said PPA the integer value of a value which is directly proportional to said determined window size factorized by the inverse of said N.

8. The computer program product according to claim 7, wherein said computer readable program code means for regulating further includes means for transmitting one acknowledgement packet for acknowledging a number of said data packets arriving at said receiver, said number being dependent on said analyzed arrival pattern indicative of said congestion condition and determined by scaling said PPA value.

9. A communications system in an asymmetric network connection according to a communications protocol wherein a receiver transmits acknowledgment packets for acknowledging data packets transmitted by a sender, said communications system including:

a timer for measuring the interval between the transmission of data from one of said receiver and sender and the reception of a response thereto by said one of said receiver and sender;

a counter for determining a window size indicative of the maximum number of said data packets transmittable by said sender for a duration absent any reception of said acknowledgment packets by said sender for said duration in accordance with said communications protocol, wherein said window size is determined using said measured interval; and a generator for regulating the frequency of transmission of said acknowledgment packets from said receiver, said regulation dependent on said determined window size; wherein said timer further measures said interval periodically;

said counter further counts the number of data packets arriving at said receiver for the duration of the last said measured interval and assigning said count to said window size; and said counter further analyzes the arrival pattern of said data packets wherein said arrival pattern is indicative of the congestion condition of said asymmetric network connection; and further including a computation means for computing the number of said data packets receivable by said receiver whereupon the transmission of an acknowledgment packet therefor is conditional, wherein said number is represented by a variable known as PPA.

10. The communications system as in claim 9, wherein said computation means computes said PPA using said determined window size and a preset number represented by a variable known as N indicative of the minimum number of acknowledgement packets transmittable by said receiver for the duration of said measured interval.

11. The communications system as in claim 10, wherein said computation means step computes said PPA by assigning said PPA the integer value of a value which is directly proportional to said determined window size factorized by the inverse of said N.

12. The communications system as in claim 11, wherein said regulator transmits one acknowledgement packet for acknowledging a number of said data packets arriving at said receiver, said number being dependent on said analyzed arrival pattern indicative of said congestion condition and determined by scaling said PPA value.

* * * * *